US012688367B1

(12) United States Patent
Schick

(10) Patent No.: US 12,688,367 B1
(45) Date of Patent: Jul. 21, 2026

(54) PLATFORM FOR SCALABLE AND EFFICIENT LEGAL DOCUMENT DRAFTING USING GENERATIVE AI AND EXPERT-IN-THE-LOOP

(71) Applicant: PAXIMAL, INC., Los Angeles, CA (US)

(72) Inventor: Ian C. Schick, Ojai, CA (US)

(73) Assignee: Paximal, Inc., Los Angeles, CA (US)

( * ) Notice: Subject to any disclaimer, the term of this patent is extended or adjusted under 35 U.S.C. 154(b) by 304 days.

(21) Appl. No.: 18/163,445

(22) Filed: Feb. 2, 2023

Related U.S. Application Data

(63) Continuation-in-part of application No. 17/230,548, filed on Apr. 14, 2021, now abandoned, and a continuation-in-part of application No. 16/901,677, filed on Jun. 15, 2020, now Pat. No. 11,593,564, said application No. 17/230,548 is a continuation-in-part (Continued)

(51) Int. Cl.
| | |
|---|---|
| *G06F 40/56* | (2020.01) |
| *G06F 40/137* | (2020.01) |
| *G06F 40/284* | (2020.01) |
| *G06F 40/30* | (2020.01) |
| *G06N 3/0475* | (2023.01) |
| *G06Q 10/10* | (2023.01) |
| *G06Q 50/18* | (2012.01) |
| *G06N 20/00* | (2019.01) |

(52) U.S. Cl.
CPC ............ *G06F 40/30* (2020.01); *G06F 40/137* (2020.01); *G06F 40/284* (2020.01); *G06F 40/56* (2020.01); *G06Q 10/10* (2013.01); *G06Q 50/184* (2013.01); *G06N 20/00* (2019.01)

(58) Field of Classification Search
CPC ........ G06F 40/232; G06F 40/30; G06F 40/56; G06Q 10/10; G06Q 50/18; G06Q 50/184; G06Q 10/103; G06N 3/0475
USPC .................... 704/8, 9; 705/300, 311; 706/12
See application file for complete search history.

(56) References Cited

U.S. PATENT DOCUMENTS

| | | |
|---|---|---|
| 5,774,833 A | 6/1998 | Newman |
| 5,799,325 A | 8/1998 | Rivette |
| | (Continued) | |

FOREIGN PATENT DOCUMENTS

| | | |
|---|---|---|
| CN | 106021207 A | 10/2016 |

OTHER PUBLICATIONS

Wikipedia, "Generative artificial intelligence", downloaded Mar. 11, 2026, 35 Pages. (Year: 2026).*

(Continued)

*Primary Examiner* — Martin Lerner
(74) *Attorney, Agent, or Firm* — Esplin & Associates, PC

(57) ABSTRACT

Systems, methods, and storage media for providing a scalable platform for improving legal drafting efficiency using generative ai and expert-in-the-loop are disclosed. Exemplary implementations may: provide a platform that allows firms to request drafting services on an on-demand basis; provide, through the platform, a two-sided marketplace supporting the network of drafters; utilize advanced technology to minimize waste in the production of legal documents; implement strict document guidelines and quality assurance procedures to ensure a consistent quality legal documents; and provide a project dashboard and automated workflows to ensure projects stay coordinated and on-schedule.

17 Claims, 8 Drawing Sheets

Related U.S. Application Data of application No. 16/840,236, filed on Apr. 3, 2020, now Pat. No. 11,023,662, said application No. 16/901,677 is a continuation-in-part of application No. 16/814,335, filed on Mar. 10, 2020, now Pat. No. 11,188,664, and a continuation-in-part of application No. 16/739,655, filed on Jan. 10, 2020, now Pat. No. 11,651,160, which is a continuation of application No. 16/510,074, filed on Jul. 12, 2019, now Pat. No. 10,572,600, said application No. 16/840,236 is a continuation of application No. 16/221,070, filed on Dec. 14, 2018, now abandoned, said application No. 16/901,677 is a continuation-in-part of application No. 16/025,720, filed on Jul. 2, 2018, now abandoned, and a continuation-in-part of application No. 16/025,687, filed on Jul. 2, 2018, now Pat. No. 10,747,953, and a continuation-in-part of application No. 15/994,756, filed on May 31, 2018, now Pat. No. 10,713,443, said application No. 16/814,335 is a continuation of application No. 15/936,239, filed on Mar. 26, 2018, now Pat. No. 10,621,371, said application No. 16/510,074 is a continuation of application No. 15/892,679, filed on Feb. 9, 2018, now Pat. No. 10,417,341.

(60) Provisional application No. 62/705,316, filed on Jun. 22, 2020, provisional application No. 62/705,315, filed on Jun. 22, 2020, provisional application No. 62/705,317, filed on Jun. 22, 2020, provisional application No. 62/626,222, filed on Feb. 5, 2018, provisional application No. 62/599,588, filed on Dec. 15, 2017, provisional application No. 62/590,274, filed on Nov. 23, 2017, provisional application No. 62/564,210, filed on Sep. 27, 2017, provisional application No. 62/561,876, filed on Sep. 22, 2017, provisional application No. 62/553,096, filed on Aug. 31, 2017, provisional application No. 62/546,743, filed on Aug. 17, 2017, provisional application No. 62/539,014, filed on Jul. 31, 2017, provisional application No. 62/534,793, filed on Jul. 20, 2017, provisional application No. 62/528,907, filed on Jul. 5, 2017, provisional application No. 62/526,316, filed on Jun. 28, 2017, provisional application No. 62/526,314, filed on Jun. 28, 2017, provisional application No. 62/523,262, filed on Jun. 22, 2017, provisional application No. 62/523,257, filed on Jun. 22, 2017, provisional application No. 62/523,258, filed on Jun. 22, 2017, provisional application No. 62/523,260, filed on Jun. 22, 2017, provisional application No. 62/519,852, filed on Jun. 14, 2017, provisional application No. 62/519,847, filed on Jun. 14, 2017, provisional application No. 62/519,850, filed on Jun. 14, 2017, provisional application No. 62/516,640, filed on Jun. 7, 2017, provisional application No. 62/515,096, filed on Jun. 5, 2017, provisional application No. 62/479,136, filed on Mar. 30, 2017, provisional application No. 62/459,199, filed on Feb. 15, 2017, provisional application No. 62/459,235, filed on Feb. 15, 2017, provisional application No. 62/459,208, filed on Feb. 15, 2017, provisional application No. 62/459,357, filed on Feb. 15, 2017, provisional application No. 62/459,246, filed on Feb. 15, 2017.

(56) References Cited

U.S. PATENT DOCUMENTS

| | | | | |
|---|---|---|---|---|
| 6,014,663 | A | 1/2000 | Rivette | |
| 6,049,811 | A | 4/2000 | Petruzzi | |
| 6,434,580 | B1 | 8/2002 | Takano | |
| 7,594,167 | B1 * | 9/2009 | Fuchs | G06F 16/958 |
| | | | | 715/255 |
| 7,890,851 | B1 | 2/2011 | Milton, Jr. | |
| 8,041,739 | B2 | 10/2011 | Glasgow | |
| 8,843,821 | B2 | 9/2014 | Tran | |
| 9,195,647 | B1 | 11/2015 | Zhang | |
| 9,355,370 | B2 * | 5/2016 | Miller | G06F 40/186 |
| 9,454,731 | B1 | 9/2016 | Lee | |
| 9,542,360 | B2 | 1/2017 | Tran | |
| 9,547,640 | B2 | 1/2017 | Bostick | |
| 9,600,566 | B2 | 3/2017 | Ganti | |
| 9,607,058 | B1 | 3/2017 | Gupta | |
| 9,734,137 | B2 | 8/2017 | Burchett | |
| 9,836,805 | B2 | 12/2017 | Rau | |
| 9,906,515 | B1 | 2/2018 | Tillman | |
| 9,946,895 | B1 | 4/2018 | Kruse | |
| 9,990,351 | B2 | 6/2018 | Tran | |
| 10,073,890 | B1 | 9/2018 | Khamis | |
| 10,242,066 | B2 | 3/2019 | Lundberg | |
| 10,417,341 | B2 | 9/2019 | Schick | |
| 10,469,425 | B1 | 11/2019 | Conley | |
| 10,572,600 | B2 | 2/2020 | Schick | |
| 10,621,371 | B1 | 4/2020 | Schick | |
| 10,713,443 | B1 | 7/2020 | Knight | |
| 10,747,953 | B1 | 8/2020 | Priyadarshi | |
| 10,839,149 | B2 | 11/2020 | Gururajan | |
| 11,023,662 | B2 | 6/2021 | Schick | |
| 11,188,664 | B2 | 11/2021 | Schick | |
| 11,341,323 | B1 | 5/2022 | Donahue, III | |
| 11,361,151 | B1 * | 6/2022 | Guberman | G06F 40/166 |
| 11,651,160 | B2 | 5/2023 | Schick | |
| 12,165,232 | B1 * | 12/2024 | Lerro | G06Q 10/1093 |
| 2001/0049707 | A1 | 12/2001 | Tran | |
| 2003/0009345 | A1 * | 1/2003 | Thorpe | G06Q 10/10 |
| | | | | 705/311 |
| 2003/0065637 | A1 | 4/2003 | Glasgow | |
| 2005/0144177 | A1 | 6/2005 | Hodes | |
| 2005/0210042 | A1 | 9/2005 | Goedken | |
| 2005/0261891 | A1 | 11/2005 | Chan | |
| 2005/0278623 | A1 | 12/2005 | Dehlinger | |
| 2006/0190807 | A1 | 8/2006 | Tran | |
| 2007/0174039 | A1 | 7/2007 | Lin | |
| 2007/0276796 | A1 | 11/2007 | Sampson | |
| 2008/0147656 | A1 | 6/2008 | Kahn | |
| 2008/0281860 | A1 | 11/2008 | Elias | |
| 2008/0313528 | A1 | 12/2008 | Chang | |
| 2009/0077092 | A1 | 3/2009 | Knight | |
| 2009/0113312 | A1 * | 4/2009 | Schoenberg | G06Q 50/18 |
| | | | | 709/204 |
| 2009/0254421 | A1 * | 10/2009 | Wolfe | G06Q 50/18 |
| | | | | 705/311 |
| 2010/0257089 | A1 | 10/2010 | Johnson | |
| 2010/0325716 | A1 | 12/2010 | Hong | |
| 2011/0184727 | A1 | 7/2011 | Connor | |
| 2011/0246438 | A1 | 10/2011 | Sathish | |
| 2011/0295895 | A1 | 12/2011 | Musgrove | |
| 2011/0307499 | A1 | 12/2011 | Elias | |
| 2012/0101803 | A1 | 4/2012 | Popov | |
| 2012/0101804 | A1 | 4/2012 | Roth | |
| 2012/0226683 | A1 | 9/2012 | Pogodin | |
| 2012/0251016 | A1 | 10/2012 | Lyons | |
| 2012/0296835 | A1 | 11/2012 | Khan K | |
| 2013/0282599 | A1 | 10/2013 | Kang | |
| 2014/0025608 | A1 * | 1/2014 | Miller | G06F 40/186 |
| | | | | 706/12 |
| 2014/0108273 | A1 | 4/2014 | Lundberg | |
| 2014/0180934 | A1 | 6/2014 | Surdeanu | |
| 2014/0249801 | A1 | 9/2014 | Jackson | |
| 2015/0106079 | A1 | 4/2015 | Bostick | |
| 2015/0134600 | A1 * | 5/2015 | Eisner | G06Q 10/101 |
| | | | | 707/608 |

(56) References Cited

U.S. PATENT DOCUMENTS

| | | | |
|---|---|---|---|
| 2015/0261745 A1 | 9/2015 | Song | |
| 2015/0278810 A1 | 10/2015 | Ramatchandirane | |
| 2015/0310000 A1 | 10/2015 | Schijvenaars | |
| 2016/0048936 A1 | 2/2016 | Perkowski | |
| 2016/0232246 A1 | 8/2016 | Rau | |
| 2016/0350886 A1 | 12/2016 | Jessen | |
| 2017/0039174 A1 | 2/2017 | Strope | |
| 2017/0124612 A1 | 5/2017 | Musgrove | |
| 2017/0185591 A1 | 6/2017 | Tetreault | |
| 2017/0185921 A1 | 6/2017 | Zhang | |
| 2017/0220544 A1 | 8/2017 | Masson | |
| 2017/0256010 A1 | 9/2017 | Mohindru | |
| 2018/0018564 A1 | 1/2018 | Erenrich | |
| 2018/0108014 A1 | 4/2018 | Williams | |
| 2018/0113934 A1 | 4/2018 | Jablonski | |
| 2018/0121419 A1 | 5/2018 | Lee | |
| 2018/0144042 A1 | 5/2018 | Sheng | |
| 2018/0150927 A1* | 5/2018 | Rickey | G06Q 50/26 |
| 2018/0232361 A1 | 8/2018 | Schick | |
| 2018/0308003 A1 | 10/2018 | Singh | |
| 2018/0329883 A1 | 11/2018 | Leidner | |
| 2018/0357800 A1 | 12/2018 | Oxholm | |
| 2019/0005707 A1 | 1/2019 | Yamada | |
| 2019/0034416 A1 | 1/2019 | Al Hasan | |
| 2019/0332674 A1 | 10/2019 | Schick | |
| 2019/0377780 A1 | 12/2019 | Carey | |
| 2020/0151393 A1 | 5/2020 | Schick | |
| 2020/0184585 A1 | 6/2020 | Shirasaka | |
| 2020/0210442 A1 | 7/2020 | Bergeron | |
| 2020/0210603 A1 | 7/2020 | Schick | |
| 2020/0234000 A1 | 7/2020 | Schick | |
| 2020/0272692 A1 | 8/2020 | Maan | |
| 2020/0311351 A1 | 10/2020 | Schick | |
| 2020/0394734 A1* | 12/2020 | Moriarty | G06Q 50/184 |
| 2021/0232759 A1 | 7/2021 | Schick | |
| 2022/0075962 A1 | 3/2022 | Kovarík | |
| 2022/0284312 A1* | 9/2022 | Brecque | G06F 40/279 |
| 2022/0343388 A1* | 10/2022 | Tan | G06Q 30/0627 |
| 2022/0366127 A1* | 11/2022 | Desh | G06F 40/20 |
| 2022/0405681 A1* | 12/2022 | Meng | G06Q 10/06398 |
| 2023/0123574 A1* | 4/2023 | Guberman | G06Q 10/10 704/9 |
| 2023/0186415 A1* | 6/2023 | Murphy | G06F 40/186 705/26.63 |

OTHER PUBLICATIONS

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.

Bouayad-Agha, N., Casamayor, G., Ferraro, G., Mille, S., Vidal, V., & Wanner, L. (Jun. 2009). Improving the comprehension of legal documentation: the case of patent claims. In Proceedings of the 12th International Conference on Artificial Intelligence and Law (pp. 78-87). (Year: 2009).

International Search Report and Written Opinion, PCT Application No. PCT/US2018/018257, mailed May 17, 2018, 15 pages.

Jhamtani, H., Gangal, V., Hovy, E., & Nyberg, E. (2017). Shakespearizing modern language using copy-enriched sequence-to-sequence models. arXiv preprint arXiv:1707.01161) (Year: 2017) 10 pages.

Marinica, C., & Guillet, F. (2010). Knowledge-based interactive postmining of association rules using ontologies. IEEE Transactions on knowledge and data engineering, 22(6), 784-797 (Year: 2010).

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun. 8, 2009), pp. 78-87, XP058361680, DOI: 10.1145/1568234.1568244; ISBN: 978-1-60558-597-0 abstract Sections 2-4; figures 1, 2.

S. H. H. Ding, B. C. M. Fung, F. Iqbal and W. K. Cheung, "Learning Stylometric Representations for Authorship Analysis," in IEEE Transactions on Cybernetics, vol. 49, No. 1, pp. 107-121, Jan. 2019 (Year: 2019).

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/1119303.1119311, abstract, Sections 1-4.

Tseng, Y. H., Lin, C. J., & Lin, Y. I. (2007). Text mining techniques for patent analysis. Information Processing & Management, 43(5), 1216-1247.

Lopez, Patrice, and Laurent Romary. "Multiple retrieval models and regression models for prior art search." arXiv preprint arXiv:0908.4413 (2009). (Year: 2009).

Oelke, Daniela, et al. "Visual readability analysis: How to make your writings easier to read." IEEE Transactions on Visualization and Computer Graphics 18.5 (2011): 662-674. (Year: 2011).

* cited by examiner

Server System 102

User Interface 104

Form 106

Marketplace 108

Document Generation System 110

Project Dashboard 112

Payment System 114

Document Management System 116

Security System 118

Analytics And Visualization Tools 120

User Interface 300

| Dashboard Header 302 | Rating System 314 |
| Project Summary 304 | Search Function 316 |
| Project Timeline 306 | Progress Bar 318 |
| Project Materials 308 | Estimated Time Of Completion 320 |
| Messaging System 310 | Assigned Attorney 322 |
| Payment System 312 | |

FIG. 3

User Interface 400

| | |
|---|---|
| Project Queue 402 | Automated Invoicing System 414 |
| Scheduling Algorithm 404 | Analytics And Reporting System 416 |
| Document Tracking System 406 | Error Tracking System 418 |
| Project History 408 | Automated Quality Assurance System 420 |
| Automated Workflow 410 | Data Encryption System 422 |
| Project Dashboard 412 | Automated Update System 424 |

FIG. 4

User Interface 600

| | |
|---|---|
| Document Review Tool 602 | Quality Assurance Checklist 612 |
| Compliance Checker 604 | Quality Assurance Report 614 |
| Document Comparison Tool 606 | Document Approval System 616 |
| Document Analytics Tool 608 | Document Delivery System 618 |
| Error Tracking System 610 | Document Archival System 620 |

FIG. 6

PLATFORM FOR SCALABLE AND EFFICIENT LEGAL DOCUMENT DRAFTING USING GENERATIVE AI AND EXPERT-IN-THE-LOOP

CROSS-REFERENCE TO RELATED APPLICATIONS

The present application is a continuation-in-part of and claims the priority benefit of U.S. patent application Ser. No. 16/901,677 entitled "SYSTEMS AND METHODS FOR EXTRACTING PATENT DOCUMENT TEMPLATES FROM A PATENT CORPUS" and filed on Jun. 15, 2020, now U.S. Pat. No. 11,593,564 issued on Feb. 28, 2023, and U.S. patent application Ser. No. 17/230,548 entitled "SYS-TEMS AND METHODS FOR PROVIDING A DATA STRUCTURE REPRESENTING PATENT CLAIMS" and filed on Apr. 14, 2021, the contents of which are incorpo-rated herein by reference in their entirety.

FIELD OF THE DISCLOSURE

The present disclosure relates to systems, methods, and storage media for providing a scalable platform for improv-ing legal drafting efficiency using generative AI and expert-in-the-loop.

BACKGROUND

The legal field has long relied on the expertise and skills of attorneys to produce high-quality legal documents. How-ever, the demand for legal services has grown significantly in recent years, leading to increased pressure on firms (e.g., law firms and corporations with legal departments) to handle large volumes of work efficiently and cost-effectively. This has led to a need for innovative solutions that can help firms scale their drafting capabilities without incurring additional hiring and management overhead.

One solution to this problem is the use of advanced technology and automation to streamline the legal document drafting process. Natural language generation (NLG) and generative artificial intelligence (AI) algorithms have been developed to automatically produce legal documents based on input data and templates. These algorithms have the potential to significantly reduce the time and effort required to draft legal documents, enabling firms to handle higher volumes of work with fewer resources.

SUMMARY

One aspect of the present disclosure relates to a system configured for providing a scalable platform for improving legal drafting efficiency using generative AI and expert-in-the-loop. The system may include one or more hardware processors configured by machine-readable instructions. The processor(s) may be configured to provide a platform that allows firms to request drafting services on an on-demand basis. The processor(s) may be configured to pro-vide, through the platform, a two-sided marketplace sup-porting the network of drafters. The processor(s) may be configured to utilize advanced technology to minimize waste in the production of legal documents. The processor(s) may be configured to implement strict document guidelines and quality assurance procedures to ensure consistent quality legal documents. The processor(s) may be configured to provide a project dashboard and automated workflows to ensure projects stay coordinated and on schedule.

Another aspect of the present disclosure relates to a method for providing a scalable platform for improving legal drafting efficiency using generative AI and expert-in-the-loop. The method may include providing a platform that allows firms to request drafting services on an on-demand basis. The method may include providing, through the platform, a two-sided marketplace supporting the network of drafters. The method may include utilizing advanced tech-nology to minimize waste in the production of legal docu-ments. The method may include implementing strict docu-ment guidelines and quality assurance procedures to ensure consistent quality legal documents. The method may include providing a project dashboard and automated workflows to ensure projects stay coordinated and on schedule.

Yet another aspect of the present disclosure relates to a non-transient computer-readable storage medium having instructions embodied thereon, the instructions being executable by one or more processors to perform a method for providing a scalable platform for improving legal draft-ing efficiency using generative AI and expert-in-the-loop. The method may include providing a platform that allows firms to request drafting services on an on-demand basis. The method may include providing, through the platform, a two-sided marketplace supporting the network of drafters. The method may include utilizing advanced technology to minimize waste in the production of legal documents. The method may include implementing strict document guide-lines and quality assurance procedures to ensure a consistent quality legal documents. The method may include providing a project dashboard and automated workflows to ensure projects stay coordinated and on schedule.

These and other features, and characteristics of the present technology, as well as the methods of operation and func-tions of the related elements of structure and the combina-tion of parts and economies of manufacture, will become more apparent upon consideration of the following descrip-tion and the appended claims with reference to the accom-panying drawings, all of which form a part of this specifi-cation, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 3 is a screenshot of a user interface for a project dashboard, showing the various features and tools available for firms to manage and track drafting projects, in accor-dance with one or more implementations.

FIG. 4 is a screenshot of a user interface for automated workflows, showing various algorithms and tools used to optimize the coordination and scheduling of drafting proj-ects, in accordance with one or more implementations.

FIG. 6 is a screenshot of a user interface for a quality assurance process, showing the various tools and procedures used to ensure the accuracy and compliance of legal documents, in accordance with one or more implementations.

DETAILED DESCRIPTION

A scalable platform for improving legal drafting efficiency using generative AI and expert-in-the-loop is disclosed. The use of NLG and generative AI algorithms in the legal field have been limited due to concerns about accuracy and compliance with legal standards. Firms have been hesitant to rely on automated systems to produce legal documents without the oversight and guidance of experienced attorneys. To address this issue, there is a need for a platform that combines the efficiency and cost-effectiveness of automated legal document drafting with the expertise and oversight of experienced attorneys.

Implementations described herein address these and other problems by providing a platform that allows firms to request drafting services on an on-demand basis from a network of vetted attorneys (e.g., solo practitioners) as drafters. The platform may utilize advanced technology and automation, including NLG and generative AI algorithms, to minimize waste and inefficiencies in the legal document drafting process. Strict document guidelines and quality assurance procedures may be implemented to ensure the accuracy and compliance of legal documents. The platform may include a project dashboard and automated workflows to ensure projects are coordinated and on schedule. This may allow firms to scale their drafting capabilities without incurring additional hiring and management overhead while ensuring the accuracy and quality of legal documents.

Figure 1:
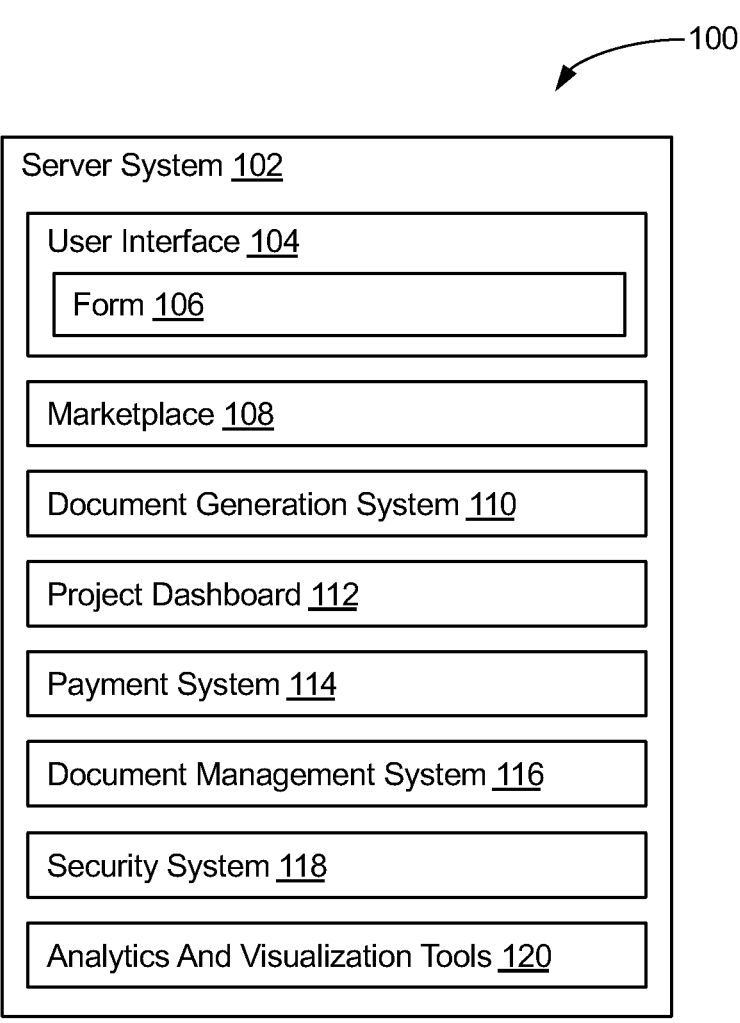
FIG. 1 is a diagram of a platform for scalable and efficient legal document drafting using generative AI and expert-in-the-loop, in accordance with one or more implementations.

There are many high-value, high-volume legal documents for which generative AI and rules-based NLG may be used with an expert-in-the-loop to mass-produce consistent, high-quality drafts. Such legal documents may include one or more of patent applications; trademark registrations; copyright registrations; legal agreements (e.g. contracts, NDAs, TOS); legal briefs and memoranda; legal pleadings (e.g. complaints, motions, petitions); legal letters and correspondence; legal research summaries and digests; legal documents for incorporation, mergers, and acquisitions; legal document for litigations and arbitration; legal documents for regulatory compliance; legal documents for immigration and visa applications; legal document for document review, drafting and negotiation; legal documents for mortgage and loan applications; and/or other legal documents FIG. 1 is a diagram of a platform 100 for scalable and efficient legal document drafting using generative AI and expert-in-the-loop, in accordance with one or more implementations. The platform 100 may include one or more of the following components and/or other components:

A server system 102 that houses the platform's software and hardware.

A user interface 104 for firms to request drafting services on an on-demand basis. The interface includes a form

106 for firms to input their drafting request, including the type of legal document, language, and specific requirements.

A marketplace 108 that connects firms with a network of drafters. Attorneys are selected based on their qualifications and expertise and can be filtered by firm size, specific legal areas, and other criteria.

An AI-powered document generation system 110 that utilizes advanced technology such as natural language generation and generative AI algorithms to automatically produce high-quality legal documents based on input data and templates.

A project dashboard 112 that allows firms to track the status of their drafting requests, communicate with the assigned attorney (i.e., at the customer law firm or in-house legal department tasked with managing the project on the customer's side), view and download completed documents, and access other tools and features such as feedback ratings, revisions, and automated workflows.

A payment system 114 for firms to securely pay for drafting services.

An advanced document management system 116 to optimize the storage and retrieval of drafting documents and minimize waste.

A security system 118 to ensure the security of sensitive information and comply with data security regulations.

Advanced analytics and visualization tools 120 for tracking and analyzing the performance and efficiency of the drafting process and identifying areas for improvement.

The platform 100 may be accessible from any device with internet access and can handle an increasing number of drafting requests from multiple firms simultaneously. Additionally, the platform 100 may be designed to handle an increasing volume of work and complexity of drafting requests as well as an increasing variety of legal document types and languages. In some implementations, the platform 100's advanced technology and streamlined processes make it scalable and efficient, minimizing waste and increasing productivity for firms.

Server system 102 may be a hardware and software-based infrastructure that runs the platform 100 for scalable and efficient legal document drafting using generative AI and expert-in-the-loop. The server system 102 may include one or more servers that house the platform 100's software and hardware. The servers are typically rack-mounted and may be located in a data center or cloud environment. The servers may be connected to a network infrastructure that enables communication with the other components of the platform 100 such as the user interface 104, marketplace 108, and project dashboard 112.

The server system 102 typically includes one or more of:

One or more Central Processing Units (CPUs) which are responsible for executing instructions that are stored in memory. These instructions are used to perform various tasks such as data processing, storage, and retrieval.

Memory such as Random-Access Memory (RAM) and storage devices such as Hard Disk Drives (HDD) or Solid-State Drives (SSD) used to store the platform's software, data, and other information.

Network interface cards (NICs) that are used to connect the servers to the network infrastructure, enabling communication with other components of the platform.

Power supplies and cooling systems that ensure the server system is functioning within the optimal temperature and power range.

A Hypervisor software that enables virtualization of the server hardware, allowing for multiple virtual machines (VMs) to run on the same physical hardware. This enables the platform to have a high level of flexibility, scalability, and security, as VMs can be easily added, removed, or moved as needed.

An operating system (OS) that manages the resources of the server system, such as the CPU, memory, and storage, and provides a platform for the platform's software to run. Common examples of OS that might be used include Windows Server, Linux, or Unix.

Database management system (DBMS) software that allows the platform to store and retrieve data in an organized and efficient manner. This might include a relational database management system (RDBMS) such as MySQL, PostgreSQL, Oracle, or SQL Server.

Backup and recovery systems that ensure the server system can be quickly and easily restored in case of failure or other issues. This typically includes data backup and disaster recovery (DR) solutions.

The server system 102 may be designed to handle high levels of traffic and ensure the platform is available at all times. The server system 102 may be configured to handle the requests of a large number of users and can scale up or down in response to traffic and demand. The server system 102 may provide a secure environment for the platform to run, with firewalls, intrusion detection and prevention systems, and other security measures in place to protect against potential threats.

User interface 104 may include a web-based interface that allows firms to request drafting services on an on-demand basis. The user interface 104 may include a form 106 for firms to input their drafting request, including the type of legal document, language, and specific requirements.

The user interface 104 typically includes one or more of:

A front-end web application that is built using technologies such as HTML, CSS, and JavaScript. The front-end application is responsible for displaying the form 106 to the users and handling input validation and error handling.

A web browser, such as Google Chrome, Microsoft Edge, or Mozilla Firefox, that runs the front-end web application.

A web server, such as Apache or Nginx, that serves the front-end web application to the users.

A RESTful API (Application Programming Interface) that allows the front-end application to communicate with the server system 102 and the marketplace 108.

A JavaScript library or framework such as AngularJS, React, or Vue.js that provides additional functionality for building the user interface such as data binding, component-based architecture, and client-side routing.

A responsive design to ensure that the user interface is accessible and usable from any device with internet access, including smartphones, tablets, and desktops.

The user interface 104 may provide a simple, intuitive, and user-friendly experience for firms, allowing them to request drafting services quickly and easily. Form 106 may be designed to be clear and straightforward, minimizing the effort required for firms to input their requirements. The front-end web application may be designed to provide real-time validation, which enables the user to identify any input errors immediately, minimizing the chance of errors on the actual request. Additionally, the use of APIs, may allow the user interface 104 to communicate with other components of the platform such as the marketplace 108, project dashboard 112, and server system 102, to provide a smooth, seamless, and efficient experience for the firms.

Form 106 is a component of the user interface 104 that allows firms to submit their drafting requests to the platform 100. The form is designed to be simple and intuitive, with clear and straightforward fields for firms to input their specific requirements.

Form 106 typically includes the following fields:

Document type field that allows firms to select the type of legal document they require, such as contracts, agreements, patents, and so on.

Language field that allows firms to specify the language of the legal document.

Specific requirements field that allows firms to input any additional details or requirements related to their drafting requests, such as specific legal terms, clauses, or formatting requirements.

File attachment field that allows firms to attach any relevant documents or files, such as previous drafts, templates, or reference materials.

Submission button that allows firms to submit their drafting request once they have filled out all the required fields.

Form 106 may be designed to be easy to use and understand, making it simple for firms to input their drafting requests. The form 106 may use real-time validation to ensure that all the required fields are filled out and the input data is correct, minimizing the chance of errors. The form 106 may utilize security measures such as encryption and tokenization to protect sensitive data entered in the form.

Once form 106 is submitted, the data is passed to the server system 102 for processing, where it is analyzed and matched with the appropriate attorney or experts from the vetted network. This allows the platform 100 to match firms quickly and efficiently with the right attorney or expert based on their specific requirements, which in turn enables the platform 100 to improve drafting efficiency using generative AI and expert-in-the-loop. Marketplace 108 is a component of the platform 100 that enables a two-sided marketplace supporting the network of drafters. The marketplace 108 may allow firms to find and connect with the right attorney or expert for their drafting request, and for attorneys and experts to find and take on new drafting requests.

The marketplace 108 typically includes the following components:

A database that stores information about the drafters and experts, such as their qualifications, experience, and areas of expertise. The database allows the platform to match firms with the appropriate attorney or expert based on their specific requirements.

A matching algorithm that uses natural language processing, machine learning, and data analytics to match firms with the right attorney or expert based on their specific requirements. The algorithm takes into account factors such as the type of legal document, language, and specific requirements.

A user-friendly interface that allows firms to browse through the drafters and experts and view their qualifications, experience, and areas of expertise. The interface is designed to be simple and intuitive, making it easy for firms to find the right attorney or expert for their drafting request.

A messaging system that allows firms to communicate with the selected attorney or expert, and for the attorney or expert to communicate with the firm. The messaging system can be integrated with the user interface, allowing firms to easily access it and communicate with their attorney or expert.

A payment system that allows firms to securely pay for drafting services. The payment system can be integrated with the user interface, allowing firms to easily make payments and view their transaction history.

A rating system that allows firms to provide feedback on the drafting services received. This rating system enables the platform to identify and promote attorneys or experts who provide high-quality services, while also providing an accountability mechanism for the attorneys or experts. The ratings can also be used to improve the matching algorithm, as it can take into account the ratings and feedback of the attorneys or experts and make better matching decisions.

The marketplace 108 may scale to handle an increasing number of drafting requests from multiple firms simultaneously, as well as an increasing volume of work for each drafting request from firms. The platform 100 may be scalable to handle an increasing complexity of drafting requests from firms, and an increasing variety of legal document types requested by firms.

The marketplace 108 may be designed to be highly secure, utilizing encrypted data transfer to ensure the security of sensitive information and prevent unauthorized access. The platform 100 may have advanced security protocols in place to protect against hacking, data breaches, and other security threats.

Overall, marketplace 108 may enable the platform 100 to provide efficient and accurate matching of firms with the right attorney or expert based on their specific requirements, which in turn improves drafting efficiency using generative AI and expert-in-the-loop.

The AI-powered document generation system 110 is a component of the platform 100 that utilizes advanced technology, such as natural language generation (NLG) and generative artificial intelligence (AI) algorithms, to automatically produce high-quality legal documents (or content for legal documents) based on input data and templates.

The AI-powered document generation system 110 typically includes one or more of:

A natural language generation (NLG) module that uses algorithms to generate legal documents based on input data and templates. The NLG module is trained on a large corpus of legal documents and uses advanced language models such as transformer-based models to generate high-quality legal documents that are accurate and fluently written.

A rules-based text generation module that ensures compliance with legal drafting standards and conventions. This module uses a set of predefined rules and guidelines to ensure that the generated legal documents adhere to the specific requirements of the firm.

A generative artificial intelligence (AI) module that uses algorithms to generate high-quality legal documents based on input data and templates. The AI module is trained on a large corpus of legal documents and uses machine learning algorithms to continually improve the accuracy and efficiency of the legal document drafting process.

A document management system that optimizes the storage and retrieval of drafting documents, making it easy to access, view, and download them as needed. The document management system also allows one to keep track of the different versions of each document and enables easy access to previous drafts and revisions for each drafting request.

Advanced data analytics and visualization tools that track and analyze the performance and efficiency of the drafting process, providing insights and identifying areas for improvement. This allows the platform to continually optimize and improve the efficiency of the legal document drafting process.

Advanced document version control system that allows keeping track of the different versions of each document, and enables easy access to previous drafts and revisions for each drafting request.

The AI-powered document generation system 110 may be designed to minimize waste in the production of legal documents and to provide a consistent quality of legal documents. With the help of AI-powered document generation system 110, the platform 100 can produce high-quality legal documents quickly and efficiently, allowing firms to handle higher volumes of work with fewer resources.

The AI-powered document generation system 110 may be designed to be highly scalable, able to handle an increasing number of drafting requests from multiple firms simultaneously, as well as an increasing volume of work for each drafting request from firms. Additionally, it is scalable to handle an increasing complexity of drafting requests from firms, and an increasing variety of legal document types requested by firms.

The AI-powered document generation system 110 may integrate with other components of the platform, such as the marketplace 108 and the user interface 104, to ensure a seamless experience for firms and attorneys. The AI-powered document generation system 110 may interface with the project dashboard 112 to provide real-time updates on the status of drafting requests, allowing firms to easily track the progress of their requests.

Overall, the AI-powered document generation system 110 may enable the platform 100 to generate high-quality legal documents efficiently and accurately, improving drafting efficiency using generative AI and expert-in-the-loop. The AI-powered document generation system 110 may allow for a faster and more streamlined legal document drafting process, which can help firms to handle high volumes of work with fewer resources.

The project dashboard 112 may be a component of the platform 100 that provides a centralized, real-time view of the status of all drafting requests, enabling firms to easily track the progress of their requests. The project dashboard 112 may be accessible from any device with internet access and can be accessed by a user via the user interface 104.

Project dashboard 112 typically includes one or more of:

Real-time updates on the status of drafting requests: This feature allows firms to view the progress of their drafting requests in real time, including the percentage of completion and the estimated time of completion.

Notifications for firms when a drafting request has been completed: This feature sends notifications to firms when their drafting request has been completed, allowing them to access the final document quickly and easily.

A history of past drafting requests and their corresponding status updates: This feature allows firms to view the status of past drafting requests and the corresponding status updates, providing a historical view of the drafting process.

A view and download function for completed drafting documents: This feature allows firms to view and download the completed drafting documents, allowing them to easily access and review the final document.

A search function to allow firms to easily locate specific drafting requests: This feature allows firms to easily search and locate specific drafting requests, enabling them to access the relevant information quickly and easily.

A progress bar to show the percentage of completion for each drafting request: This feature displays a progress bar for each drafting request, providing firms with a visual representation of the progress of their request.

An estimated time of completion for each drafting request: This feature provides an estimated time of completion for each drafting request, enabling firms to better plan their workload and schedule.

A view of the assigned attorney for each drafting request: This feature allows firms to view the assigned attorney for each drafting request, enabling them to communicate directly with the attorney working on their request.

A messaging system for firms to communicate with the assigned attorney for each drafting request: This feature allows firms to communicate directly with the assigned attorney for each drafting request, enabling them to discuss any questions or concerns they may have.

A view and download past drafts and revisions for each drafting request: This feature allows firms to view and download past drafts and revisions of their drafting requests, providing a comprehensive view of the drafting process and allowing them to easily track changes and revisions.

Project dashboard 112 may allow firms to easily track the progress of their drafting requests, stay informed about the status of their requests, and communicate with the assigned attorneys. The project dashboard 112 may provide a centralized view of all drafting requests, which enables firms to manage multiple requests efficiently and effectively. Additionally, the advanced features provided by the project dashboard 112, such as real-time updates and messaging capabilities, may improve the overall experience for firms and help to streamline the drafting process.

The payment system 114 may be a component of the platform 100 that enables firms to securely pay for drafting services. The payment system 114 typically includes one or more of:

Secure payment processing: This feature ensures that all payment transactions are secure and protected against fraud and unauthorized access. The system uses industry-standard encryption protocols and secure communication methods to protect sensitive payment information.

Multiple payment options: This feature allows firms to choose from a variety of payment methods, such as credit/debit cards, bank transfers, and digital wallets, to pay for drafting services. This makes the process more convenient for firms and allows them to choose the payment method that best suits their needs.

Automatic billing and invoicing: This feature automatically generates invoices and billing statements for firms after payment is processed. This eliminates the need for manual invoice generation and improves the overall efficiency of the payment process.

Real-time payment tracking: This feature allows firms to track the status of their payments in real time, including the amount paid, the date of payment, and the status of the payment (e.g. pending, completed, etc.). This feature helps firms to stay informed and in control of their payments and enables them to quickly resolve any issues that may arise.

Compliance with Payment Card Industry Data Security Standards (PCI DSS): This feature ensures that the payment system is compliant with the latest security standards for payment processing. The system is regularly tested and audited to ensure that it meets the PCI DSS compliance requirements.

The payment system 114 may enable firms to pay for drafting services quickly and securely. The advanced features provided by the payment system 114, such as multiple payment options, automatic billing, and real-time payment tracking, may improve the overall experience for firms and help to streamline the payment process. Additionally, compliance with the latest security standards for payment processing, such as PCI DSS, may provide an added level of security and reassurance for firms that their payment information is protected.

The advanced document management system 116 may be a component of the platform 100 that enables the efficient storage and retrieval of drafting documents.

The advanced document management system 116 typically includes the following features:

Digital document storage: This feature allows the platform to store and retrieve drafting documents in a digital format, eliminating the need for physical storage and reducing paper waste.

Automatic document versioning: This feature automatically tracks and stores different versions of a document as it is being drafted, allowing firms to access previous versions and compare changes.

Document security: This feature ensures that only authorized personnel have access to the stored documents by implementing access controls and implementing industry-standard encryption protocols to protect sensitive information.

Document retrieval and search: This feature allows firms to easily retrieve and search for specific drafting documents using keywords, categories, or other relevant information.

Automated document workflow: This feature automates the document handling process from request to delivery and enables the collaboration between different departments and/or service providers and can also track changes, comments, and progress of the project, reducing the need for manual intervention and improving the overall efficiency of the document management process.

Compliance with regulations: This feature ensures that the platform is compliant with the latest regulations for document management and data protection, such as GDPR, HIPAA, and SOX.

The advanced document management system 116 may allow for efficient and secure storage and retrieval of drafting documents, which ensures that all information is easily accessible and protected, improving the overall experience for firms and minimizing waste. Additionally, compliance with the latest regulations, such as GDPR, HIPAA, and SOX may provide an added level of security and reassurance that the platform is following the latest regulations for data protection.

Security system 118 may be a component of the platform 100 that provides comprehensive security measures to protect sensitive information. The security system 118 typically includes one or more of:

Data encryption: This feature uses industry-standard encryption algorithms to protect sensitive information, such as payment information and legal documents, from unauthorized access.

Firewall protection: This feature uses advanced firewall technology to protect the platform from malicious network attacks and unauthorized access attempts.

Access controls: This feature implements strict access controls to ensure that only authorized personnel have access to sensitive information, such as legal documents and payment information.

Two-factor authentication: This feature requires an additional layer of security, such as a one-time code sent to a user's mobile phone, to confirm the user's identity before allowing access to sensitive information.

Regular security updates: This feature ensures that the security system is updated regularly to protect against newly discovered vulnerabilities and threats.

Compliance with regulations: This feature ensures that the platform is compliant with the latest security standards, such as SOC2, HIPAA, and PCI DSS, to provide an added level of security and reassurance that the platform is following the latest security regulations.

Security system 118 may provide comprehensive security measures that ensure the protection of sensitive information, such as legal documents and payment information. The advanced features provided by the security system 118, such as data encryption, firewall protection, access controls, and compliance with the latest security standards, may provide an added level of security and reassurance for firms that their information is protected.

The advanced analytics and visualization tools 120 may be a component of the platform 100 that allows for the collection, analysis, and visualization of data related to the drafting process. The advanced analytics and visualization tools 120 typically includes one or more of:

Data collection: This feature enables the platform to collect data from various sources, such as drafting requests, drafts, and revisions, to track and analyze trends in the drafting process.

Data analysis: This feature allows the platform to use advanced algorithms, such as machine learning and statistical modeling, to analyze the collected data and identify patterns and trends that can be used to optimize the drafting process.

Data visualization: This feature provides a user-friendly interface that allows firms to view and understand the results of the data analysis. It could be a dashboard, graphics, charts, etc.

Reporting: This feature generates a report that summarizes the data analysis results, including trends, patterns, and suggestions for improvements, which can be used by firms to make informed decisions about their drafting process.

Predictive modeling: This feature uses advanced algorithms to forecast demand for drafting services and optimize resources accordingly, reducing inefficiency and waste.

Automated data updates: This feature allows for automated data updates in real time, ensuring that the data is always up to date.

Advanced analytics and visualization tools 120 may allow for the collection, analysis, and visualization of data related to the drafting process, which can be used to optimize the drafting process, improve efficiency, and reduce waste. Additionally, advanced features such as predictive modeling and automated data updates, may provide an added level of efficiency and accuracy to the platform, ensuring that firms have access to accurate and up-to-date information, which may be essential to make informed decisions regarding their drafting process.

Figure 2:
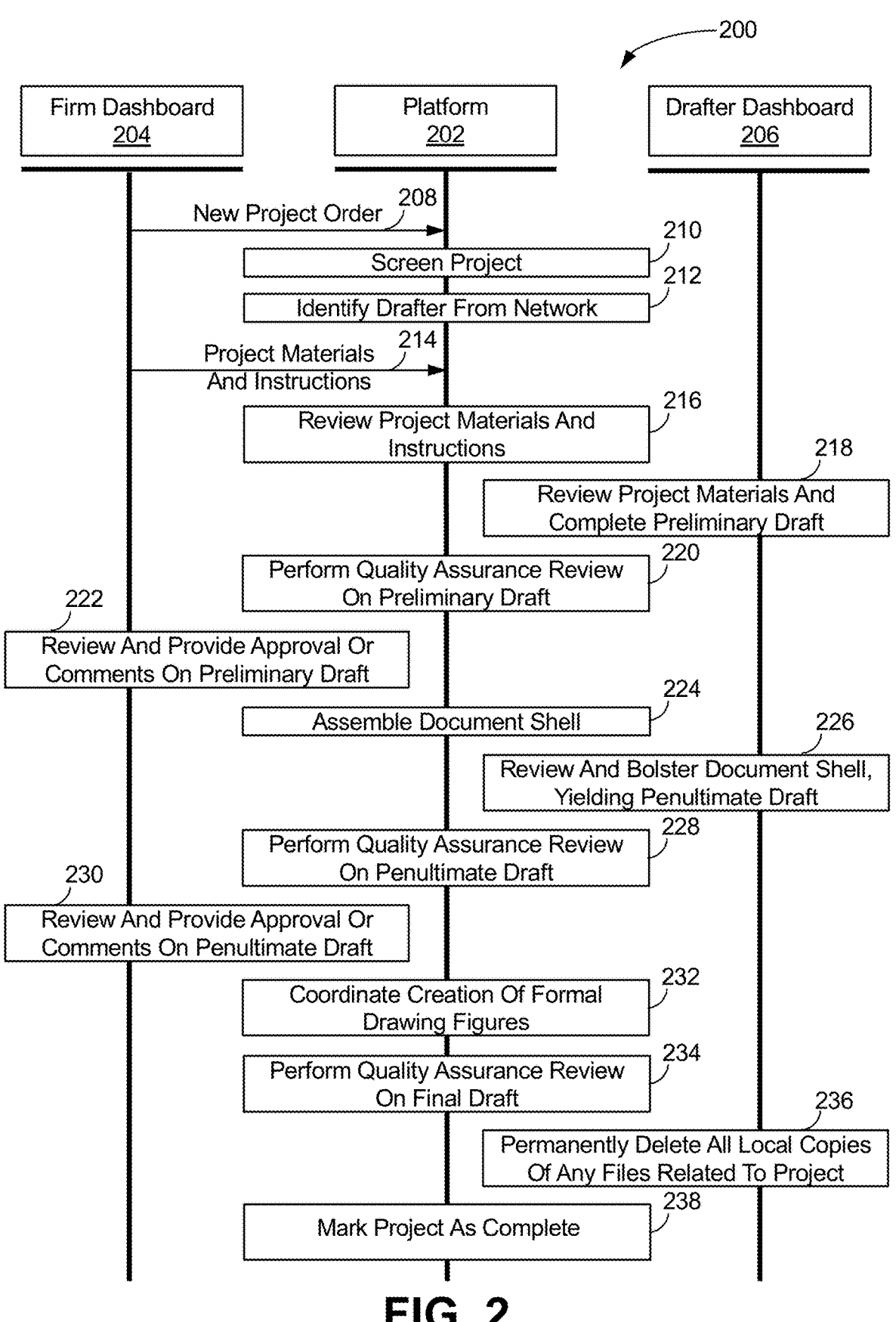
FIG. 2 is a flowchart illustrating a process of requesting and completing a drafting project using the platform, in accordance with one or more implementations.

FIG. 2 is a flowchart illustrating the process 200 of requesting and completing a drafting project using platform 202, in accordance with one or more implementations. Platform 202 may be the same as or similar to platform 100 described in connection with FIG. 1. Platform 202 may provide a firm dashboard 204 (e.g., for law-firm users or in-house users) and a drafter dashboard 206 (e.g., for vetted attorney drafters). The firm dashboard 204 may include a user interface (e.g., the user interface 104 of FIG. 1) that allows firms to manage and track their drafting projects on the platform 202, including viewing project summaries, timelines, and materials, and communicating with drafters. The drafter dashboard 206 may include a user interface (e.g., the user interface 104 of FIG. 1) that allows the network of drafters to manage and track their drafting projects on platform 202, including viewing project assignments, timelines, and materials, and communicating with law firms. The main difference between the two dashboards may be that the firm dashboard 204 is geared towards managing and tracking projects from the firm's perspective, while the drafter dashboard 206 is geared towards managing and tracking projects from the drafter's perspective.

As shown in FIG. 2, process 200 may begin with the firm submitting a new project order through platform 202's dashboard (Step 208). When a firm submits a new project order through the dashboard 202, it may need to provide specific information related to the project, such as the project name, the type of legal document being requested, the deadline for completion, and any relevant instructions or materials. They may also need to specify which drafter or team of drafters they would like to work on the project and provide any relevant information about the client or case. Additionally, the firm may be required to provide payment information or upload any necessary files or documents.

Platform 202 may then screen the project to ensure that it can take it on (Step 210). Platform 202 may screen the project in terms of capacity by analyzing the volume of work required, the complexity of the project, the number of languages required, and the type of legal document needed. The platform 202 may check the availability of the network of drafters, and the project queue to ensure that it has the necessary resources and capacity to take on the project. Additionally, platform 202 may consider factors such as the estimated time of completion and the cost of the project to ensure that it can meet the client's needs and expectations. Platform 202 may screen the project in terms of the technical or practice background of drafters by using advanced algorithms and machine learning techniques to match the project with the most suitable drafter or group of drafters. This process may involve analyzing the project's requirements, such as its legal area, complexity, and urgency, and comparing them to the qualifications, skills, and experience of the drafters.

Step 212 involves platform 202 identifying a drafter from its network with the appropriate technical background for the project, receiving confirmation that any conflicts have been cleared, and requesting project materials from the firm. Conflicts clearance is important in the legal field and may include legal conflicts, business conflicts, and, at least for patents, subject matter conflicts. Legal conflicts may refer to situations where the attorney or firm is already representing another party in the same matter or has previously represented a party with adverse interests. Business conflicts may refer to situations where the attorney or firm has a financial interest in the outcome of the matter. Subject matter conflicts may refer to situations where the attorney or firm has previously represented a party in a related matter and the attorney or firm possesses confidential information that could be used against the new client.

The firm may then provide project materials and instructions, which are placed in its "Project Materials" folder (Step 214). Platform 202 may review the project materials and instructions and place them in the drafter's "Project Materials" folder (Step 216). The drafter may then review the project materials and complete a preliminary draft, which may be placed in their "Preliminary Draft" folder (Step 218). The preliminary draft may include a brief document containing highly focused writing on core elements of the legal document. The preliminary draft may be designed to efficiently facilitate a mid-project review, ensuring the project is aimed in the right direction. The preliminary draft may include key information and research relevant to the legal document, as well as an outline of the structure and organization of the final document. The preliminary draft may be intended to provide a clear and concise overview of the project, allowing for feedback and revisions before the final draft is produced. Platform 202 may perform a quality assurance review on the preliminary draft and deposit it in the firm's "Preliminary Draft" folder (Step 220). The firm may review and provide approval or comments on the preliminary draft (Step 222). One round of revisions may be permitted at this stage.

Step 224 involves platform 202 assembling a document shell and placing it in the drafter's "Penultimate Draft" folder. A legal document shell may include a pre-defined template that serves as a structure for a specific type of legal document, such as a contract or a patent application. The legal document shell may include the standard sections, headings, and formatting required for the document, but may not include any specific content. A legal document shell populated with content from the preliminary draft, on the other hand, may include both the structure of the legal document shell and specific information provided in the preliminary draft, such as the parties involved, the terms and conditions, and the legal language that is relevant to the specific document. Additionally, auto-generated text, which may be generated by platform 202's advanced technology, may be added to the document shell to fill in any missing information or to ensure compliance with relevant laws and regulations. This may create a complete and accurate legal document that can be further reviewed and edited by network drafters (i.e., experts-in-the-loop) before final delivery to the law firm.

The drafter may review and bolster the document shell, yielding the penultimate draft, which may be placed in their "Penultimate Draft" folder (Step 226). The penultimate draft may include a more detailed and polished version of the legal document, which includes more comprehensive and complete writing on all the elements of the legal document. The penultimate draft may be designed to be fileable as—is, although it may be revised to the final draft. The penultimate draft may include all the necessary information and adhere to the relevant laws and regulations. The penultimate draft may have been reviewed and edited by the network drafter to ensure accuracy and compliance. Platform 202 may perform a quality assurance review on the penultimate draft and place it in the firm's "Penultimate Draft" folder (Step 228). The firm may review and provide approval or comments on the penultimate draft (Step 230). One round of revisions may be permitted at this stage.

Step 232 may involve platform 202 coordinating the creation of formal drawing figures (e.g., for patent application preparation projects). In Step 234, platform 202 may perform a final quality assurance review of the documents and place them in the firm's "Final Draft" folder. The drafter may permanently delete all local copies of any files related to this project (Step 236) and platform 202 may mark the project as complete (Step 238).

FIG. 3 is a screenshot of a user interface 300 for the project dashboard 112, showing the various features and tools available for firms to manage and track drafting projects, in accordance with one or more implementations. The user interface 300 may include several elements that are designed to streamline the drafting process and provide firms with complete visibility and control over their projects. The user interface 300 may include one or more of a dashboard header 302, project summary 304, project timeline 306, project materials 308, messaging system 310, the payment system 312, rating system 314, search function 316, progress bar 318, estimated time of completion 320, assigned attorney 322, and/or other components.

The dashboard header 302 may include a navigation bar that displays the name of the platform 100 and provides links to the platform 100's main features and tools. For example, firms may easily access the project dashboard 112, messaging system 310, and payment system 312 by clicking on the corresponding links in the header.

Project summary 304 may include a section that displays key information about the current project, such as the project name, status, and estimated completion date. For example, if a firm has requested a contract drafting service, the project summary may display the name of the contract and the status of the project, such as "in progress" or "completed." The estimated completion date may be displayed, providing the firm with an idea of when the final document will be ready.

Project timeline 306 may include a visual representation of the progress of the project and the various stages of the drafting process. For example, the timeline may show stages of the project such as "request received," "preliminary draft," "penultimate draft," and "final draft." Firms may easily see where the project is in the process and what the next steps are.

The project materials 308 section may allow firms to upload and review project materials and instructions. For example, if a firm needs to provide a template or specific instructions for the drafting of a contract, they may upload the files to this section and the network of drafters may have access to them. Firms may view and download completed drafts in the project materials 308.

The messaging system 310 may enable communication between firms and the network of drafters, allowing for real-time collaboration and feedback. For example, if a firm has a question about the drafting process, it may use the messaging system to communicate with the assigned attorney and vice versa. This may allow for a seamless flow of information and ensures that the project stays on track.

The payment system 312 may allow firms to securely pay for drafting services. For example, the payment system 312 may display the cost of the project and any payments made. Firms may use the system to make payments and track their financials easily.

The rating system 314 may allow firms to provide feedback on the drafting services received, and the results are used to identify and improve the performance of the network of drafters. For example, firms may rate quality of service, timeliness of delivery, and communication with the assigned attorney. This feedback may be used to continuously improve the platform's services.

The search function 316 may allow firms to easily locate specific drafting requests. For example, if a firm has multiple drafting requests, it may use the search function 316 to find a specific request by entering keywords such as the project name or the assigned attorney's name.

The progress bar 318 may show the percentage of completion for each drafting request. For example, a progress bar may show the percentage of completion for a contract drafting request, such as 50% or 75%. This may allow firms to track the progress of their requests and see how far along they are in the drafting process.

The estimated time of completion 320 for each drafting request may be shown. For example, if a firm has requested a contract drafting service, the estimated time of completion may be displayed, providing the firm with an idea of when the final document will be ready.

The assigned attorney 322 for each drafting request can be viewed. For example, if a firm has requested a contract drafting service assigned to a specific attorney at the firm, the assigned attorney's name and contact information may be displayed on the project dashboard 112.

The project dashboard 112 may allow firms to view and download past drafts and revisions for each drafting request. Overall, the user interface 300 for the project dashboard 112 may be designed to provide firms with a streamlined, efficient, and user-friendly way to manage and track their drafting projects.

FIG. 4 is a screenshot of a user interface 400 for automated workflows, showing various algorithms and tools used to optimize the coordination and scheduling of drafting projects, in accordance with one or more implementations. The user interface 400 may include one or more of a project queue 402, scheduling algorithm 404, document tracking system 406, project history 408, automated workflow 410, project dashboard 412, automated invoicing system 414, analytics and reporting system 416, error tracking system 418, automated quality assurance system 420, data encryption system 422, automated update system 424, and/or other components.

Project queue 402 may display all of the active drafting projects and allows firms to prioritize and manage the flow of work. The project queue 402 may be designed to be easy to use, with an intuitive interface that makes it easy to view, sort, and manage projects. The project queue 402 may be designed to be highly customizable, with a wide range of options and settings that allow firms to tailor the queue to their specific needs.

The scheduling algorithm 404 may utilize advanced AI and machine learning techniques to optimize the allocation of resources and scheduling of projects, ensuring that projects are completed efficiently and on time. The scheduling algorithm 404 may be designed to take into account a wide range of factors, such as project complexity, resource availability, and project deadlines, to ensure that projects are completed as quickly and efficiently as possible.

The document tracking system 406 may allow firms to monitor the progress of each project in real-time, including status updates, milestones, and estimated completion dates. The document tracking system 406 may provide detailed information on the status of each project, including the current stage of the drafting process, the estimated completion time, and the resources currently assigned to the project.

Project history 408 may provide a record of past drafting projects, including completed projects and any relevant metrics, such as completion times and project costs. The project history 408 may provide a detailed record of all past projects, allowing firms to review and analyze their performance over time, and identify trends and patterns that can help to improve future projects.

The automated workflow 410 may allow for the seamless integration of all the elements of the platform 100, from the project queue 402 to the final delivery of the draft, ensuring that the process is smooth and streamlined. The automated workflow 410 may be designed to automate many of the tasks associated with project management, including scheduling, tracking, and quality assurance, reducing the administrative burden on firms and ensuring that projects are completed efficiently and on time.

The project dashboard 412 may provide a comprehensive overview of all the active projects, including real-time updates, detailed metrics, and tools for communication and collaboration. Aspects of the project dashboard 412 may be the same as or similar to the project dashboard 112 of FIG. 1. Firms may use the project dashboard 412 to easily track the progress of each project, view and download completed drafts, and communicate with the assigned attorney for each project. The project dashboard 412 may include a search function (e.g., the search function 316 of FIG. 3) to allow firms to easily locate specific drafting requests and a progress bar (e.g., the progress bar 318 of FIG. 3) to show the percentage of completion for each drafting request.

The automated invoicing system 414 may allow for automated billing and payment, saving time and reducing the administrative burden on firms. The automated invoicing system 414 may automatically calculate the cost of each project based on the project materials and instructions provided by the firm and generate an invoice that can be easily reviewed and paid online. This may eliminate the need for manual invoicing and reduce the chances of errors or delays.

The analytics and reporting system 416 may provide detailed insights into the performance of the platform 100, including metrics on project completion times, resource utilization, and other key performance indicators. Firms may use this information to identify areas for improvement and optimize their use of the platform 100. The analytics and reporting system 416 may provide data on the performance of the network of drafters, allowing firms to identify high-performing attorneys and make informed decisions about who to work with in the future.

The error tracking system 418 may help to identify and resolve any issues that arise during the drafting process, ensuring that projects are completed with minimal errors or delays. The error tracking system 418 may automatically detect and report any errors that occur, and provide detailed information on how to fix them. This may ensure that projects are completed quickly and efficiently, and reduces the chances of mistakes or errors.

The automated quality assurance system 420 may utilize advanced algorithms and machine learning techniques to ensure that all drafts are of the highest quality and adhere to the relevant guidelines and standards. For example, the automated quality assurance system 420 may check for consistency in formatting, grammar, and legal terminology, and flag any inconsistencies for review by the network of drafters. The automated quality assurance system 420 may compare the draft to a library of previously approved documents to ensure compliance with company or industry standards.

The data encryption system 422 may ensure that all data is securely stored and transmitted, protecting sensitive information from unauthorized access or breaches. For example, the data encryption system 422 may use industry-standard encryption algorithms such as AES or RSA to encrypt all data before it is stored or transmitted. Additionally, the data encryption system 422 may use secure protocols such as HTTPS or SSL to protect data in transit.

The automated update system 424 may ensure that the platform 100 is always up-to-date and running smoothly, with regular updates and maintenance to ensure that the platform is always at its best. For example, the automated update system 424 may automatically check for updates and install them as needed, ensuring that the platform 100 is always running the most recent version. Additionally, the automated update system 424 may perform routine maintenance tasks such as backups and optimization to ensure that the platform 100 is running efficiently and reliably.

Figure 5:
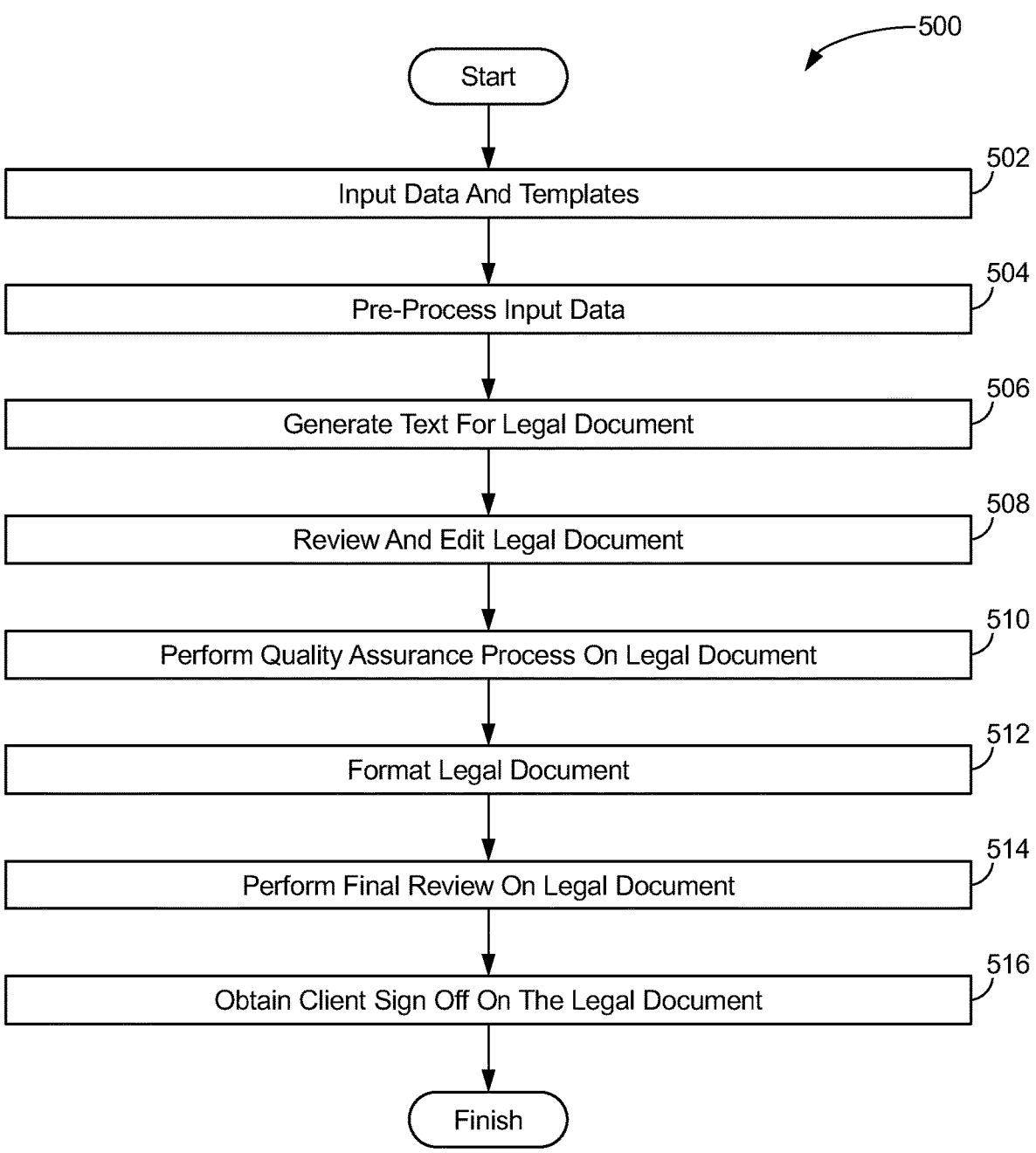
FIG. 5 is a flowchart illustrating a process of using generative AI algorithms to produce legal documents based on input data and templates, in accordance with one or more implementations.

FIG. 5 is a flowchart illustrating the process 500 of using generative AI algorithms to produce legal documents based on input data and templates, in accordance with one or more implementations. Step 502 involves the input of data and templates. In this step, the firm user may input the necessary data and templates required to generate the legal document. This may include information such as client details, case details, invention disclosure, instructions, and any specific formatting or wording requirements. The firm user may input this data manually through a user interface (e.g., user interface 104, 300, 400), or it may be automatically imported from a database or other external system. The templates used may be pre-existing templates provided by the platform, or they may be custom templates created by the user. The templates may be extracted from a legal document corpus. The input data and templates may include specific language or legal terms, as well as formatting and layout requirements.

Step 504 involves pre-processing of data. The input data may be pre-processed to ensure that it is in the correct format and structure for the AI algorithms to process. This may include cleaning, normalizing, and structuring the data. The pre-processing step may include tasks such as removing any duplicated or irrelevant data, correcting any errors or inconsistencies in the input data, and converting the data into a format that is compatible with the AI algorithms. The platform 100 may ensure that the input data is in a format that can be easily understood and processed by the AI algorithms and that the generated document is accurate and relevant. The platform 100 may makes sure that the data is in a consistent format and structure, so the AI algorithms can produce a consistent and high-quality legal document. The platform 100 may ensure that the data is compliant with the laws and regulations of the jurisdiction in which the document will be used.

Step 506 involves text generation. In this step, the AI algorithms may use the input data and templates to generate parts or all of the legal document. This may include using natural language generation (NLG) algorithms such as recurrent neural networks (RNNs), long short-term memory (LSTM) networks, and transformer networks to generate text that is grammatically correct and semantically coherent. Generative AI algorithms such as GPT-3, and BERT may use deep learning techniques to analyze the input data and templates and generate text that is coherent, accurate, and relevant to the client's needs. The algorithms may use rules-based text generation, where a set of predefined rules and templates are used to generate a specific legal document. The generated text may be in the form of a draft, which can be reviewed and edited by an expert-in-the-loop to ensure that it is accurate, legally compliant, and meets the specific needs and preferences of the client. The text generation step may be configured to ensure the generated text is accurate, coherent, and relevant to the client's needs to ensure the final document meets the client's requirements.

Step 508 involves review and editing. The generated document is reviewed and edited by an expert-in-the-loop (e.g., a vetted attorney drafter, a firm attorney, etc.), who ensures that the document is accurate, legally compliant, and meets the specific needs and preferences of the client. The platform 100 may ensure that the generated document is of high quality and meets the client's requirements. The expert-in-the-loop may review the document for grammatical errors, logical inconsistencies, and legal inaccuracies, and make any necessary corrections. The expert-in-the-loop may make suggestions for improving the document's readability, clarity, and relevance to the client's needs. The expert-in-the-loop may ensure that the document is compliant with the laws and regulations of the jurisdiction in which the document will be used. The review and editing step may be done manually or by an AI-based system, depending on the platform 100's settings. The review and editing step may include the use of automated proofreading tools such as BLUEPENCIL, GRAMMARLY, HEMINGWAY, and other similar tools. The platform 100 may ensure that the final document is of high quality, accurate, and legally compliant.

Step 510 involves quality assurance. The document may be subject to a quality assurance process to ensure that it meets the standards and guidelines set by the platform 100. The platform 100 may ensure that the document is of high quality, accurate, and legally compliant. The quality assurance process may include automated checks such as spell checking, grammar checking, and punctuation checking. It may include manual reviews by a team of experts to ensure that the document is coherent, accurate, and relevant to the client's needs. The manual reviews may check for compliance with the laws and regulations of the jurisdiction in which the document will be used. The quality assurance process may include the use of AI-based systems to check the document for any errors or inaccuracies. The platform 100 may ensure that the final document is of high quality, accurate, and legally compliant. The quality assurance process may include the use of an expert-in-the-loop to ensure that the document is accurate, legally compliant, and meets the specific needs and preferences of the client.

Step 512 involves formatting. The document may be formatted to meet the specific formatting requirements specified by the client. The platform 100 may ensure that the final document is visually appealing and easy to read. Formatting may include adjusting the font, spacing, and margins, as well as adding any necessary tables, images, or charts. This step may include adding any specific branding or logos as required by the client. The document may be formatted in accordance with the laws and regulations of the jurisdiction in which it will be used. The formatting step may be done manually or by an AI-based system, depending on the platform 100's settings. The formatting step may include the use of automated formatting tools such as Microsoft Word, Google Docs, and other similar tools. The platform 100 may ensure that the final document is visually appealing, easy to read, and compliant with the laws and regulations of the jurisdiction in which it will be used.

Step 514 involves a final review. The document may be reviewed one final time before it is delivered to the client. The platform 100 may ensure that the final document is of high quality and meets the client's requirements. The final review may be done by an expert-in-the-loop or by a team of experts to ensure that the document is coherent, accurate, and relevant to the client's needs. The final review may check for compliance with the laws and regulations of the jurisdiction in which the document will be used. The final review may include a final proofreading and editing step to ensure that the document is free of errors, grammatical mistakes, and any other inaccuracies. The final review step may include the use of automated proofreading tools such as Grammarly, Hemingway, and other similar tools. The platform may ensure that the final document is of high quality, accurate, and legally compliant and meets the client's requirements.

Step 516 involves sign-off. The final document may be sent to the client for sign-off. The platform 100 may ensure that the client is satisfied with the final document and that it meets their requirements. The client will review the document and confirm that it is accurate, legally compliant, and meets their specific needs and preferences. The client may make any necessary changes or revisions to the document before signing off. The sign-off step may be done manually or electronically, depending on the platform 100's settings. The sign-off step may include the use of digital signature tools such as DocuSign, Adobe Sign, and other similar tools. The platform 100 may ensure that the final document is accurate, legally compliant, and meets the client's requirements and that the client is satisfied with the final document.

FIG. 6 is a screenshot of a user interface 600 for a quality assurance process, showing the various tools and procedures used to ensure the accuracy and compliance of legal documents, in accordance with one or more implementations. The quality assurance process may be an integral part of the platform 100's document generation system and may be designed to ensure that all legal documents produced by the platform 100 meet the highest standards of accuracy, compliance, and consistency. The user interface 600 may include one or more of a document review tool 602, compliance checker 604, document comparison tool 606, document analytics tool 608, error tracking system 610, quality assurance checklist 612, quality assurance report 614, document approval system 616, document delivery system 618, document archival system 620, and/or other components.

The document review tool 602 may allow network drafters to review and edit legal documents, ensuring that they are accurate and compliant with relevant laws and regulations. This tool may include a variety of editing and formatting options, as well as built-in checks for common errors and inconsistencies. For example, the document review tool 602 may highlight any missing citations and provide suggestions for alternative citations. The document review tool 602 may check for grammatical errors and suggest corrections. The document review tool 602 may use advanced algorithms and natural language processing techniques to identify and resolve errors in legal documents.

The compliance checker 604 may include an automated tool that scans legal documents for compliance with relevant laws and regulations. The compliance checker 604 may use advanced algorithms and machine learning techniques to identify potential issues and provides recommendations for how to resolve them. For example, the compliance checker 604 may check for compliance with data privacy laws and regulations, such as GDPR. It may check for compliance with other laws and regulations, such as HIPAA for healthcare documents. The compliance checker 604 may help to ensure that legal documents are compliant with relevant laws and regulations.

The document comparison tool 606 may be used to compare legal documents to templates and other reference documents, ensuring that they are consistent and adhere to the relevant guidelines and standards. The document comparison tool 606 may include a variety of options for comparing different types of documents, including text-based comparison, visual comparison, and side-by-side comparison. For example, the document comparison tool 606 may compare a draft patent application to a template of a standard patent application, highlighting any deviations from the template. The document comparison tool 606 may compare different versions of a document to identify changes and revisions. The document comparison tool 606 may help in ensuring that legal documents are consistent and adhere to the relevant guidelines and standards.

The document analytics tool 608 may provide detailed insights into the performance of legal documents, including metrics on readability, compliance, and consistency. The document analytics tool 608 may include a variety of options for analyzing different types of documents, including text-based analysis, visual analysis, and statistical analysis. For example, the document analytics tool 608 may analyze a draft patent application to determine its readability, compliance with patent laws and regulations, and consistency with similar patent applications. The document analytics tool 608 may provide metrics on the document's length, word count, and other key indicators. The document analytics tool 608 may help in identifying potential issues and areas for improvement in legal documents.

The error tracking system 610 may help to identify and resolve any issues that arise during the quality assurance process, ensuring that legal documents are accurate and compliant. The error tracking system 610 may include a variety of options for tracking different types of errors, including text-based tracking, visual tracking, and statistical tracking. For example, the error tracking system 610 may flag any errors in grammar, punctuation, or formatting in a draft patent application. The error tracking system 610 may track the number of errors found, the types of errors found, and the steps taken to resolve them. The error tracking system 610 may help in identifying and resolving any issues that arise during the quality assurance process.

The quality assurance checklist 612 may be a comprehensive list of the steps that must be taken to ensure the accuracy and compliance of legal documents. The quality assurance checklist 612 may be used by network drafters to ensure that all relevant checks and procedures are performed, and is also used to track the progress of the quality assurance process. For example, the quality assurance checklist 612 may include steps such as reviewing the document for compliance with relevant laws and regulations, comparing the document to templates and other reference documents, and analyzing the document's readability and consistency. The quality assurance checklist 612 may help in ensuring that all relevant checks and procedures are performed during the quality assurance process.

Quality assurance report 614 may include a detailed report that summarizes the results of the quality assurance process. The quality assurance report 614 may include information on the number of errors found, the types of errors found, and the steps taken to resolve them. It may include metrics on the performance of legal documents, such as readability, compliance, and consistency. For example, the quality assurance report 614 may include a summary of the number of errors found in a draft patent application, the types of errors found, and the steps taken to resolve them. The quality assurance report 614 may include metrics on the document's readability, compliance with patent laws and regulations, and consistency with similar patent applications. The quality assurance report 614 may help in providing a comprehensive overview of the quality assurance process.

Document approval system 616 may allow firms to review and approve legal documents before they are delivered. The document approval system 616 may include a variety of options for reviewing different types of documents, including text-based review, visual review, and side-by-side review. It may include a messaging system for communicating with network drafters and a system for providing feedback on the quality of the legal documents. For example, the document approval system 616 may allow a firm to review and approve a draft patent application before it is delivered to the patent office. The document approval system 616 may provide a messaging system for the firm to communicate with the network drafters, and a system for the firm to provide feedback on the quality of the patent application. The document approval system 616 may help in ensuring that legal documents are accurate and compliant before they are delivered.

Document delivery system 618 may be used to deliver legal documents to firms. The document delivery system 618 may include options for delivering documents in various formats, such as PDF, Word, or HTML. It may include a messaging system for communicating with firms, allowing them to receive updates on the delivery process and provide feedback. The document delivery system 618 may include a tracking system that allows firms to see the status of their deliveries, including the date and time of delivery, the recipient, and delivery confirmation.

The document archival system 620 may be used to store and archive legal documents. The document archival system 620 may include options for storing documents in various formats, such as PDF, Word, or HTML. It may include a system for tracking the progress of the archival process, allowing firms to see when a document was archived and by whom. The document archival system 620 may include a search function that allows firms to easily locate specific archived documents, using keywords, document type, or date range. The document archival system 620 may include a security feature that ensures that only authorized users have access to the stored documents.

Figure 7:
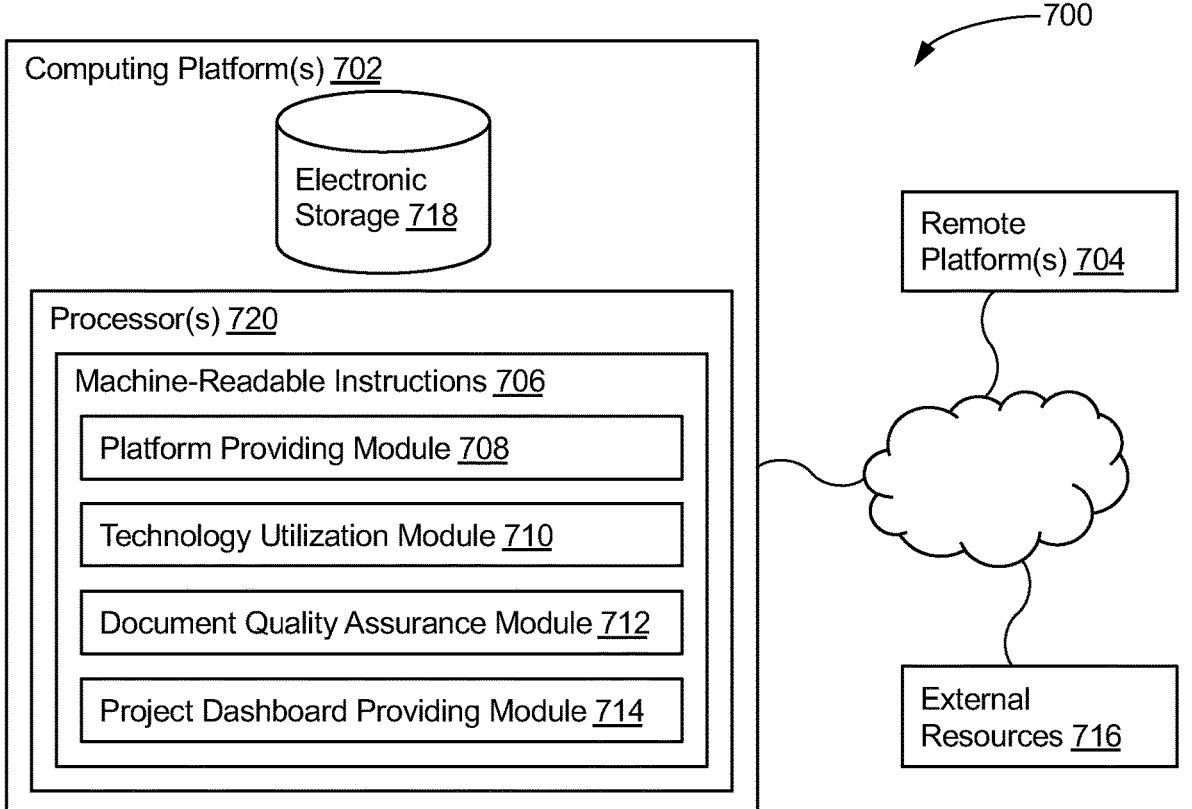
FIG. 7 illustrates a system configured for providing a scalable platform for improving legal drafting efficiency using generative AI and expert-in-the-loop, in accordance with one or more implementations.

FIG. 7 illustrates a system 700 configured for providing a scalable platform for improving legal drafting efficiency using generative AI and expert-in-the-loop, in accordance with one or more implementations. In some implementations, system 700 may include one or more computing platforms 702. Computing platform(s) 702 may be configured to communicate with one or more remote platforms 704 according to a client/server architecture, a peer-to-peer architecture, and/or other architectures. Remote platform(s) 704 may be configured to communicate with other remote platforms via computing platform(s) 702 and/or according to a client/server architecture, a peer-to-peer architecture, and/or other architectures. Users may access system 700 via remote platform(s) 704.

Computing platform(s) 702 may be configured by machine-readable instructions 706. Machine-readable instructions 706 may include one or more instruction modules. The instruction modules may include computer program modules. The instruction modules may include one or more of platform providing module 708, technology utilization module 710, document quality assurance module 712, project dashboard providing module 714, and/or other instruction modules.

Platform providing module 708 may be configured to provide a platform that allows firms to request drafting services on an on-demand basis. On-demand basis refers to the ability for firms to request drafting services as needed, rather than being tied to a specific schedule or contract. The platform may include a secure portal through which firms can request drafting services. The platform may include a dashboard for firms to track the status of their drafting requests. The platform may include a messaging system for communication between firms and the network of drafters. The platform may be accessible from any device with internet access.

The platform may utilize encrypted data transfer to ensure the security of sensitive information. "Sensitive information" refers to confidential or private information that must be protected from unauthorized access or breaches. The platform may include a payment system for firms to securely pay for drafting services. The platform may include a rating system for firms to provide feedback on the drafting services received. The platform may be hosted on a network of servers dedicated to providing drafting services. The platform may be scalable to handle an increasing number of drafting requests from firms. The dashboard may include real-time updates on the status of drafting requests.

The dashboard may include notifications for firms when a drafting request has been completed. The dashboard may include a history of past drafting requests and their corresponding status updates. The dashboard may allow firms to view and download completed drafting documents. The dashboard may include a search function to allow firms to easily locate specific drafting requests. The dashboard may include a progress bar to show the percentage of completion for each drafting request. The dashboard may include an estimated time of completion for each drafting request.

The dashboard may allow firms to view the assigned attorney for each drafting request. The dashboard may include a messaging system for firms to communicate with the assigned attorney for each drafting request. The dashboard may allow firms to view and download past drafts and revisions for each drafting request. The platform may be scalable to handle an increasing number of drafting requests from multiple firms simultaneously. The platform may be scalable to handle an increasing volume of work for each drafting request from firms. The platform may be scalable to handle an increasing complexity of drafting requests from firms.

The platform may be scalable to handle an increasing variety of legal document types requested by firms. The platform may be scalable to handle an increasing number of languages requested by firms. The platform may be scalable due to its advanced technology and streamlined processes for handling drafting requests. The platform may be scalable due to its ability to expand the network of drafters as demand for drafting services increases. The platform may be scalable due to its ability to add additional servers to the network as demand for drafting services increases. The platform may be scalable due to its ability to automate and streamline administrative tasks, allowing for efficient handling of increasing demand for drafting services.

The platform may be scalable due to its ability to track and analyze data on drafting requests and optimize processes accordingly to handle increasing demand. The platform may use algorithms to match firms with the most qualified attorneys for their drafting requests based on practice areas and experience. The platform may allow firms to browse the profiles of drafters and view their qualifications and ratings before making a drafting request. The platform may be accessible to firms and drafters through secure login credentials. The platform's two-sided marketplace may allow for increased scalability of drafting services by providing a flexible pool of attorneys to handle surges in demand. The platform's two-sided marketplace may allow for increased efficiency in the legal workforce by matching firms with the most qualified attorneys for their drafting needs.

The algorithms may use artificial intelligence to analyze the qualifications and experience of drafters and match them with firms based on their specific drafting needs. The algorithms take into account the availability of drafters and prioritize matching them with firms based on their availability. The algorithms may use machine learning to continually improve the accuracy of matching firms with the most qualified attorneys for their drafting requests. The algorithms may allow firms to prioritize matching with drafters who have specific industry expertise relevant to their drafting needs. The algorithms may allow firms to specify any language requirements for their drafting requests and match them with drafters who are proficient in those languages. The algorithms may allow firms to specify any specific practice areas or legal document types they require for their drafting requests and match them with drafters who have expertise in those areas.

The algorithms may allow firms to specify any specific pricing or budget constraints for their drafting requests and match them with drafters who meet those requirements. The algorithms may allow firms to specify any specific deadlines for their drafting requests and prioritize matching them with drafters who can meet those deadlines. The algorithms may use natural language processing to analyze the qualifications and experience of drafters and match them with firms based on their specific drafting needs. The algorithms may use data analytics to analyze the past performance and success rates of drafters and match them with firms based on their potential to provide high-quality drafting services. The algorithms may use predictive modeling to forecast the demand for drafting services from firms and match them with the most qualified drafters based on that forecast. The algorithms may use machine learning algorithms such as decision trees and support vector machines to improve the accuracy of matching firms with the most qualified attorneys for their drafting requests.

The algorithms may use Neural Networks to analyze the qualifications and experience of drafters and match them with firms based on their specific drafting needs. The algorithms may use collaborative filtering techniques to match firms with drafters based on the similarities in their past drafting requests and preferences. The algorithms use clustering techniques to group together firms with similar drafting needs and match them with the most qualified drafters in those groups. The algorithms may use optimization techniques such as linear programming and genetic algorithms to maximize the efficiency and accuracy of matching firms with drafters for their drafting requests. The algorithms may use artificial intelligence techniques such as deep learning and reinforcement learning to continually improve the accuracy of matching firms with the most qualified attorneys for their drafting requests. The algorithms may use machine learning techniques such as ensemble methods and boosting to improve the accuracy of matching firms with the most qualified attorneys for their drafting requests.

The platform includes a feature that for may provide targeted assistance to these firms, such as providing access to specialized expertise or additional training.

Platform providing module 708 may be configured to provide, through the platform, a two-sided marketplace supporting the network of drafters. The platform may include the two-sided marketplace in which firms can anonymously request drafting services from a pool of drafters. The platform may allow drafters to anonymously accept drafting requests from firms through the two-sided marketplace. The platform may allow drafters to set their availability and pricing for drafting services through the two-sided marketplace. The platform may include a rating system for firms and attorneys to provide feedback on their experiences in the two-sided marketplace.

The platform may include a dispute resolution process to handle any issues that may arise in the two-sided marketplace. The algorithms may consider the ratings and feedback provided by firms and drafters in the two-sided marketplace to improve the accuracy of future matches. The algorithms may allow firms to specify their preferred qualifications and experience for the drafters they are matched with. The rating system may allow firms to rate the quality of drafting services received from drafters on a scale of 1 to 5. The rating system may allow drafters to rate the clarity and completeness of drafting requests received from firms on a scale of 1 to 5. The rating system may allow firms and drafters to leave written feedback on their experiences in the two-sided marketplace.

The rating system may use artificial intelligence to analyze the ratings and feedback provided by firms and drafters and use that data to improve the accuracy of future matches. The rating system may allow firms to view the ratings and feedback of drafters before making a drafting request. The rating system may allow drafters to view the ratings and feedback of firms before accepting a drafting request. The rating system may include a dispute resolution process for handling any issues that may arise between firms and drafters related to the quality of drafting services. The rating system may include a notification system to alert firms and drafters of any changes in their ratings or feedback. The rating system may be accessible to firms and drafters through their secure login credentials.

The rating system may be used to calculate a reputation score for each firm and drafter based on their ratings and feedback, which is used to improve the accuracy of future matches. The rating system results may be not visible to firms and are only used to evaluate the performance of drafters. The rating system results may be used to identify underperforming drafters and remove them from the network if their ratings fall below a certain threshold. The rating system results may be used to provide feedback and coaching to drafters who may be struggling to meet the standards of the network. The rating system results may be used to monitor the overall quality of the network of drafters and identify areas for improvement. The rating system results may be used to identify trends and patterns in the feedback provided by firms and use that data to optimize the matching process and improve the overall quality of drafting services.

The rating system results may be used to identify firms that may be difficult to work with or have unrealistic expectations and adjust the matching process accordingly to improve the overall satisfaction of drafters. The rating system results may be used to identify firms that consistently provide high-quality drafting requests and prioritize matching them with top-performing drafters. The rating system results may be used to identify firms that may have complex or specialized drafting needs and match them with drafters who have the necessary expertise and experience. The rating system results may be used to identify firms that require additional support and resources from the network of drafters.

Technology utilization module 710 may be configured to utilize advanced technology to minimize waste in the production of legal documents. The advanced technology may include the use of machine learning algorithms to optimize the drafting process and minimize errors and waste. The advanced technology may include the use of natural language processing to analyze and improve the efficiency of drafting language. The advanced technology may include the use of data analytics to track and analyze trends in drafting requests and optimize processes accordingly. The advanced technology may include the use of predictive modeling to forecast demand for drafting services and optimize resources accordingly.

The advanced technology may include the use of automation and AI-powered tools to streamline administrative tasks and minimize waste. The advanced technology may include the use of cloud-based servers to provide scalable and efficient handling of drafting requests. The advanced technology may include the use of advanced document management systems to optimize the storage and retrieval of drafting documents and minimize waste. The advanced technology may include the use of digital signatures and electronic document filing systems to minimize paper waste and streamline the drafting process. The advanced technology may include the use of advanced project management tools to optimize the coordination and scheduling of drafting requests and minimize waste. The advanced technology may include the use of artificial intelligence and machine learning algorithms to continually improve and optimize the drafting process and minimize waste.

The advanced technology may include the use of advanced data analytics and visualization tools to track and analyze the performance and efficiency of the drafting process and identify areas for improvement. The natural language processing technology may include the use of natural language generation algorithms to generate legal documents based on input data and templates. The natural language processing technology may include the use of rules-based text generation algorithms to ensure compliance with legal drafting standards and conventions. The natural language processing technology may include the use of generative artificial intelligence algorithms to generate high-quality legal documents based on input data and templates. The natural language processing technology may include the use of machine learning algorithms to continually improve the accuracy and efficiency of the legal document drafting process. The natural language processing technology may include the use of advanced language models such as transformer-based models to optimize the accuracy and fluency of generated legal documents.

The natural language processing technology may include the use of advanced summarization algorithms to optimize the brevity and clarity of legal documents. The natural language processing technology may include the use of advanced semantic analysis algorithms to optimize the precision and clarity of legal language in generated documents. The natural language processing technology may include the use of advanced syntax analysis algorithms to optimize the structure and formatting of legal documents. The natural language processing technology may include the use of advanced context analysis algorithms to optimize the coherence and consistency of generated legal documents. The natural language generation technology may include the use of advanced machine learning algorithms to optimize the efficiency and accuracy of the legal document drafting process. The natural language generation technology may include the use of advanced natural language processing algorithms to analyze input data and generate legal documents that meet specific requirements and guidelines.

By way of non-limiting example, the natural language generation technology may include the use of advanced text generation algorithms to generate legal documents that are coherent, well-structured, and conform to legal conventions and standards. The natural language generation technology may include the use of advanced data analytics and visualization tools to track and analyze the performance and efficiency of the legal document drafting process and identify areas for improvement. By way of non-limiting example, the natural language generation technology may include the use of advanced natural language processing algorithms to analyze input data and generate legal documents that are tailored to specific firms, industries, or practice areas. The natural language generation technology may include the use of advanced machine learning algorithms to continually improve the accuracy and efficiency of the legal document drafting process based on feedback and performance data. The natural language generation technology may include the use of advanced natural language processing algorithms to analyze and optimize the clarity and simplicity of legal language in generated documents. The natural language generation technology may include the use of advanced natural language processing algorithms to analyze and optimize the formatting and structure of generated legal documents.

The natural language generation technology may include the use of advanced natural language processing algorithms to analyze and optimize the precision and accuracy of legal terminology and language in generated documents. The natural language generation technology may include the use of advanced machine learning algorithms to adapt to the specific preferences and guidelines of firms in the drafting process.

Document quality assurance module 712 may be configured to implement strict document guidelines and quality assurance procedures to ensure a consistent quality legal documents. By way of non-limiting example, the natural language processing technology may include the use of advanced algorithms such as deep learning models like Recurrent Neural Networks, Long Short-Term Memory, and Attention-based models for natural language understanding and natural language generation, to ensure high-quality, accurate, and consistent legal documents, as well as the use of Named Entity Recognition, Part-of-Speech tagging, and Syntactic parsing algorithms for language-specific processing to structure, format and conform the legal documents to the defined legal drafting standards and conventions.

Project dashboard providing module 714 may be configured to provide a project dashboard and automated workflows to ensure projects stay coordinated and on-schedule. The project dashboard may include a user-friendly interface that allows firms to easily request drafting services and track the progress of their projects. The project dashboard may include advanced data analytics and visualization tools to track and analyze the performance and efficiency of drafting projects. The project dashboard may include advanced project management tools to optimize the coordination and scheduling of drafting projects. The project dashboard may include advanced document management systems and tools to optimize the storage and retrieval of legal documents.

The project dashboard may include advanced communication and collaboration tools to facilitate communication between firms and drafters. The project dashboard may include advanced security and privacy measures to protect the confidentiality of legal documents and information. The project dashboard may be accessible from any device with an internet connection. The project dashboard may be scalable and can handle a high volume of drafting requests. The project dashboard may be customizable and can be tailored to the specific needs and preferences of firms. The project dashboard may be continuously updated and improved based on user feedback and data analytics.

The automated workflows may include the use of advanced algorithms to optimize the coordination and scheduling of drafting projects. The automated workflows may include the use of machine learning algorithms to continually improve the efficiency and accuracy of the drafting process. The automated workflows may include the use of advanced natural language processing algorithms to optimize the clarity and simplicity of legal language in legal documents. The automated workflows may include the use of advanced natural language processing algorithms to optimize the formatting and structure of legal documents. The automated workflows may include the use of advanced data analytics and visualization tools to track and analyze the performance and efficiency of drafting projects. The automated workflows may include the use of advanced document management systems and tools to optimize the storage and retrieval of legal documents.

The automated workflows may include the use of advanced communication and collaboration tools to facilitate communication between firms and drafters. The automated workflows may be scalable and can handle a high volume of drafting requests. The automated workflows may be customizable and can be tailored to the specific needs and preferences of firms. The automated workflows may be continuously updated and improved based on user feedback and data analytics. The use of lean production principles in the automated workflows may allow for efficient and cost-effective drafting of legal documents. The use of lean production principles in the automated workflows may minimize waste and inefficiencies in the legal document drafting process.

The use of lean production principles in the automated workflows may allow for real-time monitoring and optimization of the drafting process.

In some implementations, by way of non-limiting example, the strict document guidelines may include requirements for formatting, structure, language, and legal terminology in legal documents. In some implementations, by way of non-limiting example, the strict document guidelines may include requirements for referencing, citing, and quoting legal sources and precedent in legal documents. In some implementations, by way of non-limiting example, the strict document guidelines may include requirements for the clarity, simplicity, and precision of legal language in legal documents. In some implementations, the strict document guidelines may include requirements for the accuracy and completeness of legal information in legal documents. In some implementations, the strict document guidelines may be customized for specific firms and practice areas based on their specific needs and preferences.

In some implementations, the strict document guidelines may be updated and revised on a regular basis to ensure compliance with changing laws and regulations. In some implementations, the strict document guidelines may be communicated to drafters through training and onboarding materials. In some implementations, the strict document guidelines may be enforced through periodic quality assurance checks and reviews by senior attorneys. In some implementations, the strict document guidelines may be implemented through the use of advanced natural language processing and machine learning algorithms to automatically check and enforce compliance. In some implementations, the strict document guidelines may be implemented through the use of advanced document management systems and tools to ensure the accuracy and completeness of legal documents. In some implementations, the quality assurance procedures may include the use of automated checks and algorithms to ensure compliance with strict document guidelines.

In some implementations, by way of non-limiting example, the quality assurance procedures may include the use of advanced natural language processing algorithms to automatically check for errors, inconsistencies, and omissions in legal documents. In some implementations, the quality assurance procedures may include the use of machine learning algorithms to continually improve the accuracy and efficiency of the quality assurance process. In some implementations, the quality assurance procedures may include periodic reviews by senior attorneys to ensure compliance with strict document guidelines and the overall quality of legal documents. In some implementations, the quality assurance procedures may include the use of advanced data analytics and visualization tools to track and analyze the performance and efficiency of the quality assurance process and identify areas for improvement. In some implementations, the quality assurance procedures may include the use of advanced project management tools to coordinate and schedule the quality assurance process and ensure timely delivery of legal documents. In some implementations, the quality assurance procedures may include the use of advanced document management systems and tools to optimize the storage and retrieval of legal documents and ensure their accuracy and completeness.

In some implementations, the quality assurance procedures may include the use of advanced automated testing and debugging tools to ensure the accuracy and efficiency of legal documents. In some implementations, the quality assurance procedures may include the use of advanced natural language processing algorithms to optimize the clarity and simplicity of legal language in legal documents. In some implementations, the quality assurance procedures may include the use of advanced natural language processing algorithms to optimize the precision and accuracy of legal terminology and language in legal documents. In some implementations, by way of non-limiting example, the availability of drafters to provide human-written text, review and/or edit generated text, and act as expert-in-the-loop may ensure the accuracy and quality of legal documents. In some implementations, by way of non-limiting example, the availability of drafters to provide human-written text, review and/or edit generated text, and act as expert-in-the-loop may ensure compliance with strict document guidelines and legal standards. In some implementations, by way of non-limiting example, the availability of drafters to provide human-written text, review and/or edit generated text, and act as expert-in-the-loop may allow for flexibility and customization of legal documents to meet specific needs and preferences.

In some implementations, the use of generative AI may be for legal documents is enhanced by the availability of drafters to act as expert-in-the-loop and ensure the accuracy and quality of generated documents. In some implementations, the use of generative AI may be for legal documents is enhanced by the availability of drafters to act as expert-in-the-loop and provide oversight and guidance to ensure compliance with legal standards and guidelines. In some implementations, the use of generative AI may be for legal documents is enhanced by the availability of drafters to act as expert-in-the-loop and provide real-time feedback and guidance to improve the accuracy and efficiency of the drafting process. In some implementations, the use of generative AI may be for legal documents is enhanced by the availability of drafters to act as expert-in-the-loop and provide human judgment and expertise in areas where AI may be less effective.

In some implementations, computing platform(s) 702, remote platform(s) 704, and/or external resources 716 may be operatively linked via one or more electronic communication links. For example, such electronic communication links may be established, at least in part, via a network such as the Internet and/or other Networks. It will be appreciated that this is not intended to be limiting, and that the scope of this disclosure includes implementations in which computing platform(s) 702, remote platform(s) 704, and/or external resources 716 may be operatively linked via some other communication media.

A given remote platform 704 may include one or more processors configured to execute computer program modules. The computer program modules may be configured to enable an expert or user associated with the given remote platform 704 to interface with system 700 and/or external resources 716, and/or provide other functionality attributed herein to remote platform(s) 704. By way of non-limiting example, a given remote platform 704 and/or a given computing platform 702 may include one or more of a server, a desktop computer, a laptop computer, a handheld computer, a tablet computing platform, a NetBook, a Smartphone, a gaming console, and/or other computing platforms.

External resources 716 may include sources of information outside of system 700, external entities participating with system 700, and/or other resources. In some implementations, some or all of the functionality attributed herein to external resources 716 may be provided by resources included in system 700.

Computing platform(s) 702 may include electronic storage 718, one or more processors 720, and/or other components. Computing platform(s) 702 may include communication lines, or ports to enable the exchange of information with a network and/or other computing platforms. Illustration of computing platform(s) 702 in FIG. 7 is not intended to be limiting. Computing platform(s) 702 may include a plurality of hardware, software, and/or firmware components operating together to provide the functionality attributed herein to computing platform(s) 702. For example, computing platform(s) 702 may be implemented by a cloud of computing platforms operating together as computing platform(s) 702.

Electronic storage 718 may comprise non-transitory storage media that electronically stores information. The electronic storage media of electronic storage 718 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 718 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 718 may include one or more virtual storage resources (e.g., cloud storage, a virtual private network, and/or other virtual storage resources). Electronic storage 718 may store software algorithms, information determined by processor(s) 720, information received from computing platform(s) 702, information received from remote platform(s) 704, and/or other information that enables computing platform(s) 702 to function as described herein.

Processor(s) 720 may be configured to provide information processing capabilities in computing platform(s) 702. As such, processor(s) 720 may include one or more of a digital processor, an analog processor, a digital circuit designed to process information, an analog circuit designed to process information, a state machine, and/or other mechanisms for electronically processing information. Although processor(s) 720 is shown in FIG. 7 as a single Entity, this is for illustrative purposes only. In some implementations, processor(s) 720 may include a plurality of processing units. These processing units may be physically located within the same device, or processor(s) 720 may represent processing functionality of a plurality of devices operating in coordination. Processor(s) 720 may be configured to execute modules 708, 710, 712, and/or 714, and/or other modules. Processor(s) 720 may be configured to execute modules 708, 710, 712, and/or 714, and/or other modules by software; hardware; firmware; some combination of software, hardware, and/or firmware; and/or other mechanisms for configuring processing capabilities on processor(s) 720. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 708, 710, 712, and/or 714 are illustrated in FIG. 7 as being implemented within a single processing unit, in implementations in which processor(s) 720 includes multiple processing units, one or more of modules 708, 710, 712, and/or 714 may be implemented remotely from the other modules. The description of the functionality provided by the different modules 708, 710, 712, and/or 714 described below is for illustrative purposes, and is not intended to be limiting, as any of modules 708, 710, 712, and/or 714 may provide more or less functionality than is described. For example, one or more of modules 708, 710, 712, and/or 714 may be eliminated, and some or all of its functionality may be provided by other ones of modules 708, 710, 712, and/or 714. As another example, processor(s) 720 may be configured to execute one or more additional modules that may perform some or all of the functionality attributed below to one of modules 708, 710, 712, and/or 714.

Figure 8:
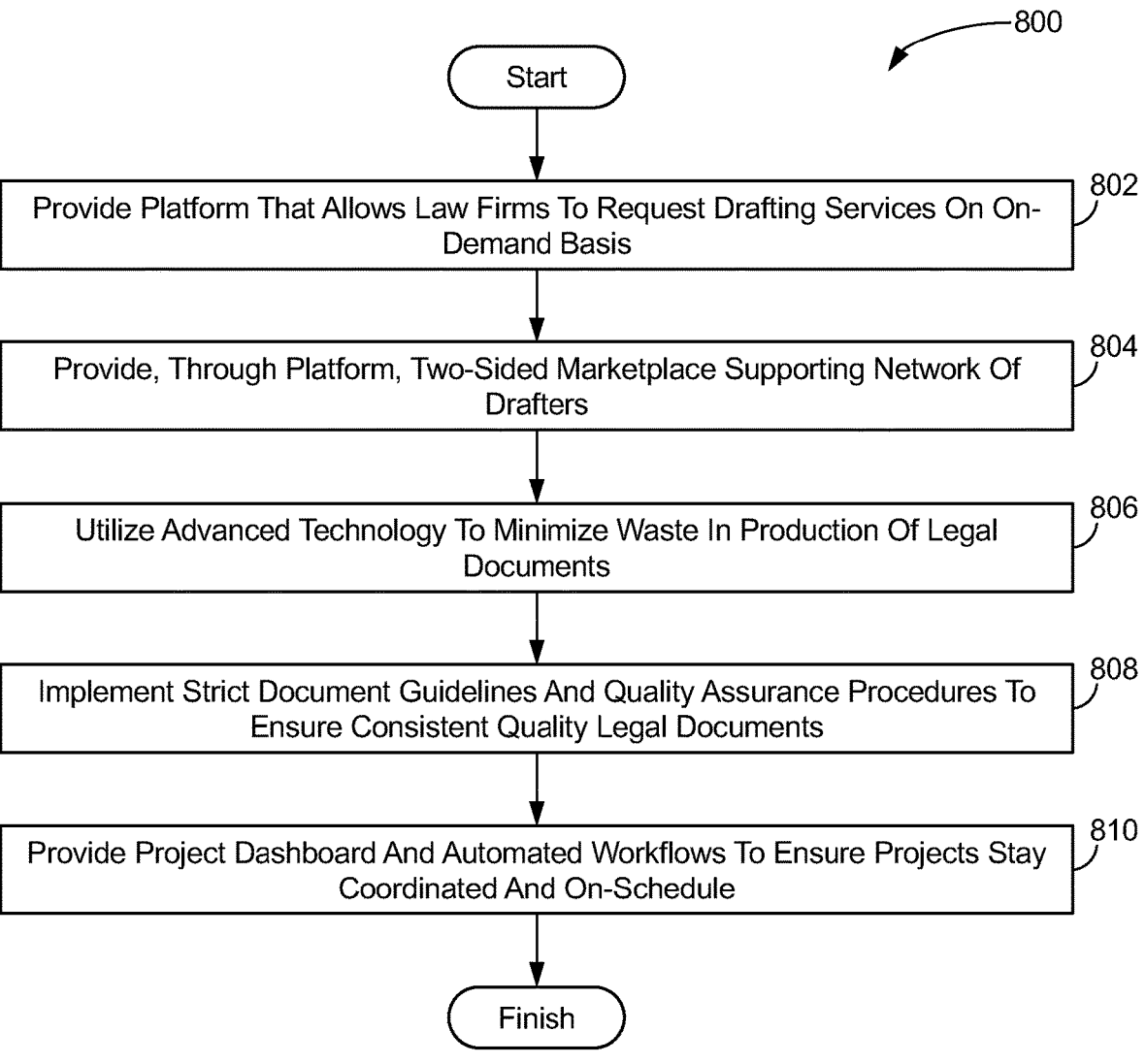
FIG. 8 illustrates a method for providing a scalable platform for improving legal drafting efficiency using generative AI and expert-in-the-loop, in accordance with one or more implementations.

FIG. 8 illustrates a method 800 for providing a scalable platform for improving legal drafting efficiency using generative AI and expert-in-the-loop, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

An operation 802 may include providing a platform that allows firms to request drafting services on an on-demand basis. Operation 802 may be performed by one or more hardware processors configured by machine-readable instructions including a module that is the same as or similar to platform providing module 708, in accordance with one or more implementations.

An operation 804 may include providing, through the platform, a two-sided marketplace supporting the network of drafters. Operation 804 may be performed by one or more hardware processors configured by machine-readable instructions including a module that is the same as or similar to platform providing module 708, in accordance with one or more implementations.

An operation 806 may include utilizing advanced technology to minimize waste in the production of legal documents. Operation 806 may be performed by one or more hardware processors configured by machine-readable instructions including a module that is the same as or similar to technology utilization module 710, in accordance with one or more implementations.

An operation 808 may include implementing strict document guidelines and quality assurance procedures to ensure a consistent quality legal documents. Operation 808 may be performed by one or more hardware processors configured by machine-readable instructions including a module that is the same as or similar to document quality assurance module 712, in accordance with one or more implementations.

An operation 810 may include providing a project dashboard and automated workflows to ensure projects stay coordinated and on-schedule. Operation 810 may be performed by one or more hardware processors configured by machine-readable instructions including a module that is the same as or similar to project dashboard providing module 714, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for legal document production using generative AI, comprising:

providing a platform through which a drafting process for drafting legal documents is carried out;

providing, through the platform, a user interface through which users initiate and participate in the drafting process;

providing a document generation system to facilitate the drafting process through the platform to produce the legal documents, the document generation system utilizing machine learning algorithms to facilitate the drafting process in production of the legal documents through a series of steps guided by the users in the user interface, wherein the series of steps includes:

receiving input data from the users defining instructions for generating content of the legal documents;

pre-processing the input data to structure the input data for the machine learning algorithms;

generating new text content for the legal documents via generative AI algorithms based on the pre-processing of the input data and the instructions; and presenting the new text content within the user interface for review and editing by the users;

implementing document guidelines and quality assurance procedures via the document generation system to conform the legal documents to predetermined criteria; and providing a project dashboard and automated workflows via the user interface to manage and view status of projects associated with the production of the legal documents.

2. The method of claim 1, wherein the platform includes a secure portal through which the users initiate the drafting process.

3. The method of claim 1, wherein the platform includes a messaging system.

4. The method of claim 1, wherein the platform utilizes encrypted data transfer to ensure security of sensitive information.

5. The method of claim 1, wherein the platform includes a rating system to provide feedback on the legal documents produced through the document generation system.

6. The method of claim 1, wherein the project dashboard includes real-time updates on status of the production of the legal documents.

7. The method of claim 1, wherein the project dashboard is configured to cause the legal documents to be downloaded upon completion.

8. The method of claim 1, wherein the project dashboard includes a search function.

9. The method of claim 1, wherein the project dashboard is configured to facilitate viewing and downloading of past drafts and revisions for individual ones of the legal documents.

10. The method of claim 1, wherein the platform is configured to produce multiple ones of the legal documents simultaneously.

11. The method of claim 1, wherein the platform is configured based on complexity requirements.

12. The method of claim 1, wherein the platform is configured based on language requirements.

13. The method of claim 1, wherein the document generation system further utilizes natural language processing in the production of the legal documents.

14. The method of claim 1, wherein the platform utilizes predictive modeling configured to forecast demand for the production of the legal documents.

15. The method of claim 1, wherein the platform utilizes project management tools configured to optimize coordination and scheduling of the production of the legal documents.

16. A system configured for legal document production using generative AI, the system comprising:

one or more hardware processors configured by machine-readable instructions to:

provide a platform through which a drafting process for drafting legal documents is carried out;

provide, through the platform, a user interface through which users initiate and participate in the drafting process;

provide a document generation system to facilitate the drafting process to produce the legal documents, the document generation system utilizing machine learning algorithms to facilitate the drafting process in production of the legal documents through a series of steps guided by the users in the user interface, wherein the series of steps includes:

receiving input data from the users defining instructions for generating content of the legal documents;

pre-processing the input data to structure the input data for the machine learning algorithms;

generating new text content for the legal documents via generative AI algorithms based on the pre-processing of the input data and the instructions; and presenting the new text content within the user interface for review and editing by the users;

implement document guidelines and quality assurance procedures via the document generation system to conform the legal documents to predetermined criteria; and provide a project dashboard and automated workflows via the user interface to manage and view status of projects associated with the production of the legal documents.

17. A non-transient computer-readable storage medium having instructions embodied thereon, the instructions being executable by one or more processors to perform a method for legal document production using generative AI, the method comprising:

providing a platform through which a drafting process for drafting legal documents is carried out;

providing, through the platform, a user interface through which users initiate and participate in the drafting process;

providing a document generation system to facilitate the drafting process through the platform to produce the legal documents, the document generation system utilizing machine learning algorithms to facilitate the drafting process in production of the legal documents through a series of steps guided by the users in the user interface, wherein the series of steps includes:

receiving input data from the users defining instructions for generating content of the legal documents;

pre-processing the input data to structure the input data for the machine learning algorithms;

generating new text content for the legal documents via generative AI algorithms based on the pre-processing of the input data and the instructions; and presenting the new text content within the user interface for review and editing by the users;

implementing document guidelines and quality assurance procedures via the document generation system to conform the legal documents to predetermined criteria; and providing a project dashboard and automated workflows via the user interface to manage and view status of projects associated with the production of the legal documents.

* * * * *